US006765610B1

(12) United States Patent  
Nakamura

(10) Patent No.: US 6,765,610 B1  
(45) Date of Patent: Jul. 20, 2004

(54) PHOTOSENSOR SYSTEM AND DRIVE CONTROL METHOD THEREOF

(75) Inventor: Yoshiaki Nakamura, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 806 days.

(21) Appl. No.: 09/695,624

(22) Filed: Oct. 24, 2000

(30) Foreign Application Priority Data

Nov. 10, 1999 (JP) ............................................. 11-319859

(51) Int. Cl.[7] ........................ H04N 5/228; H04N 5/235; H04N 5/335; H01L 31/00
(52) U.S. Cl. .............................. 348/222.1; 348/221.1; 348/229.1; 348/302; 250/332
(58) Field of Search ......................... 348/222.1, 229.1, 348/230.1, 236, 302, 308, 216.1, 217.1, 264, 265, 266, 362, 364, 365, 296, 367, 297, 221.1; 250/332

(56) References Cited

U.S. PATENT DOCUMENTS

| | | | |
|---|---|---|---|
| 4,316,660 A | * 2/1982 | Ohtsubo et al. | 396/201 |
| 4,701,626 A | * 10/1987 | Ishizaki et al. | 250/208.3 |
| 5,461,419 A | 10/1995 | Yamada | |
| 5,532,484 A | * 7/1996 | Sweetser et al. | 250/332 |
| 5,583,570 A | 12/1996 | Yamada | |
| 5,793,422 A | * 8/1998 | Mochizuki et al. | 348/296 |
| 5,963,657 A | 10/1999 | Bowker et al. | |
| 5,974,163 A | * 10/1999 | Kamei | 382/125 |
| 6,373,550 B2 | * 4/2002 | Tsuchihashi et al. | 355/40 |
| 6,498,576 B1 | * 12/2002 | Tian et al. | 341/155 |
| 6,618,090 B1 | * 9/2003 | Kidono et al. | 348/362 |
| 6,665,010 B1 | * 12/2003 | Morris et al. | 348/297 |
| 2001/0040632 A1 | * 11/2001 | Yang et al. | 348/294 |

FOREIGN PATENT DOCUMENTS

WO   WO 93/04556   3/1993

OTHER PUBLICATIONS

Patent Abstracts of Japan, vol. 1999, No. 12, Oct. 29, 1999 & JP 11–205662 A (Nissan Motor Co. Ltd.), Jul. 30, 1999—Abstract only.
Patent Abstracts of Japan, vol. 018, No. 137 (E–1518), Mar. 7, 1994 & JP 05–316432 A (Canon Inc.), Nov. 26, 1993—Abstract only.

* cited by examiner

Primary Examiner—Wendy R. Garber
Assistant Examiner—Lin Ye
(74) Attorney, Agent, or Firm—Frishauf, Holtz, Goodman & Chick, P.C.

(57) ABSTRACT

This invention reads image data of a subject by performing pre-reading operation while changing the image reading sensitivity at a plurality of stages immediately before the start of normal reading operation of a subject image, calculates the absolute difference value between adjacent pixels of lightness data of the read image data, and sets as an optimal reading sensitivity an image reading sensitivity having a maximum absolute difference value among calculated absolute difference values in a photosensor system having a photosensor array constituted by two-dimensionally arraying a plurality of photosensors, a driver circuit for supplying a drive signal to the photosensors, and a controller for controlling reading operation of a subject image and sensitivity setting. Even when ambient light changes or the characteristics of the photosensor change, an optimal image reading sensitivity can be set in accordance with the changes. Further, even when a position where the subject is placed in the detection area of the photosensor array offsets from a normal position in performing pre-reading operation, and the read image data contains a background pattern together with the subject image, a proper image reading sensitivity can be extracted and set without any influence of the background pattern. An image reading sensitivity setting method having high reliability can be provided.

16 Claims, 20 Drawing Sheets

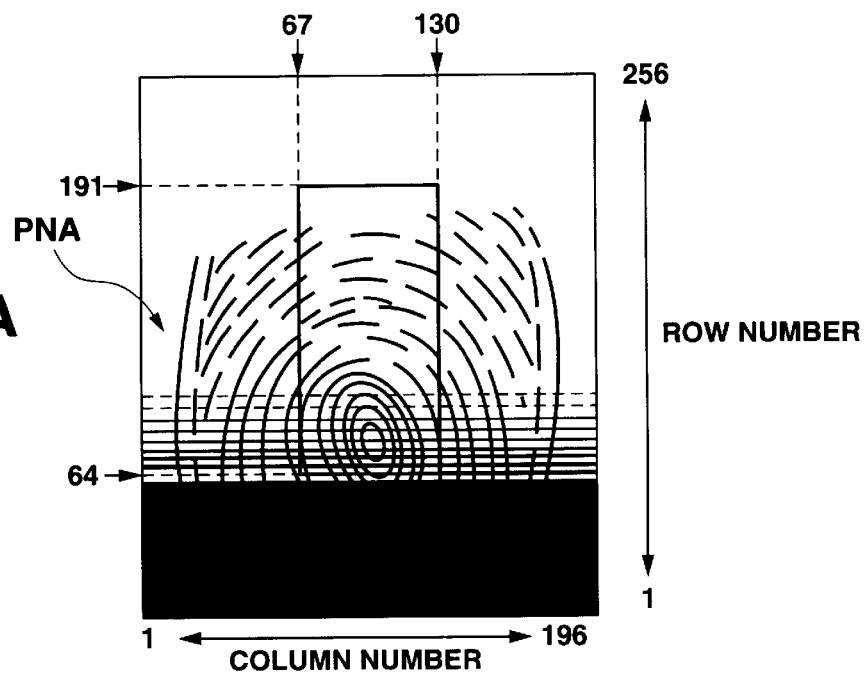
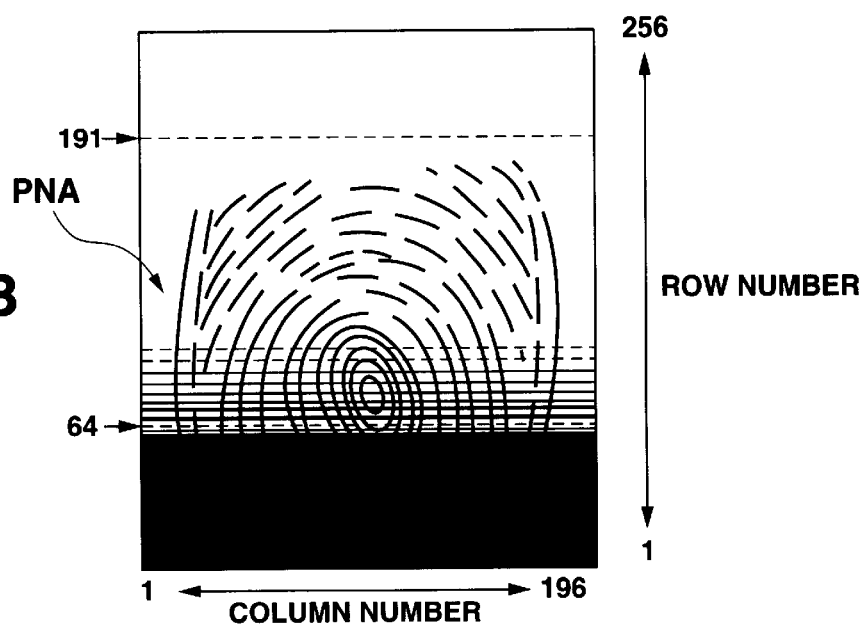

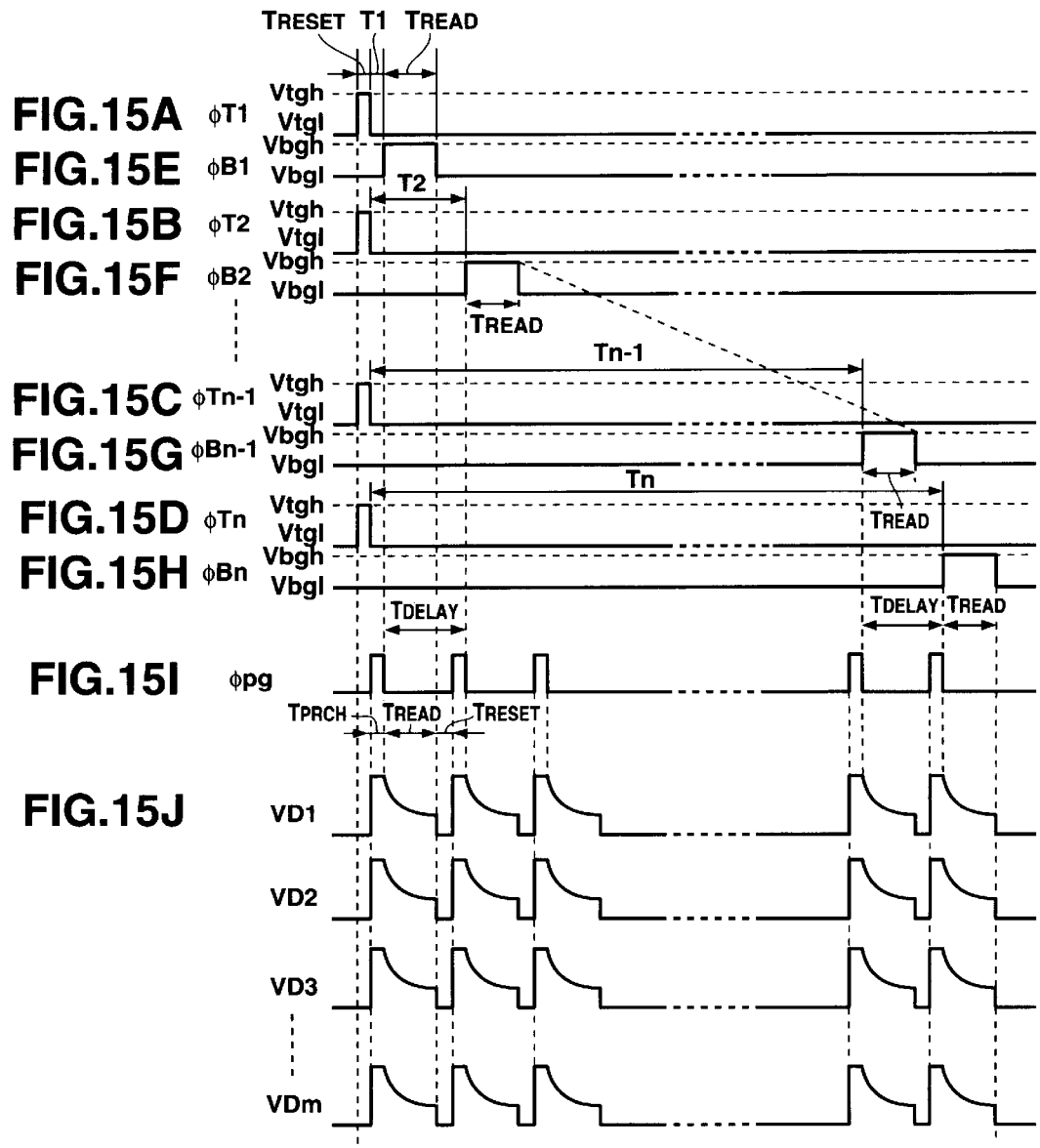

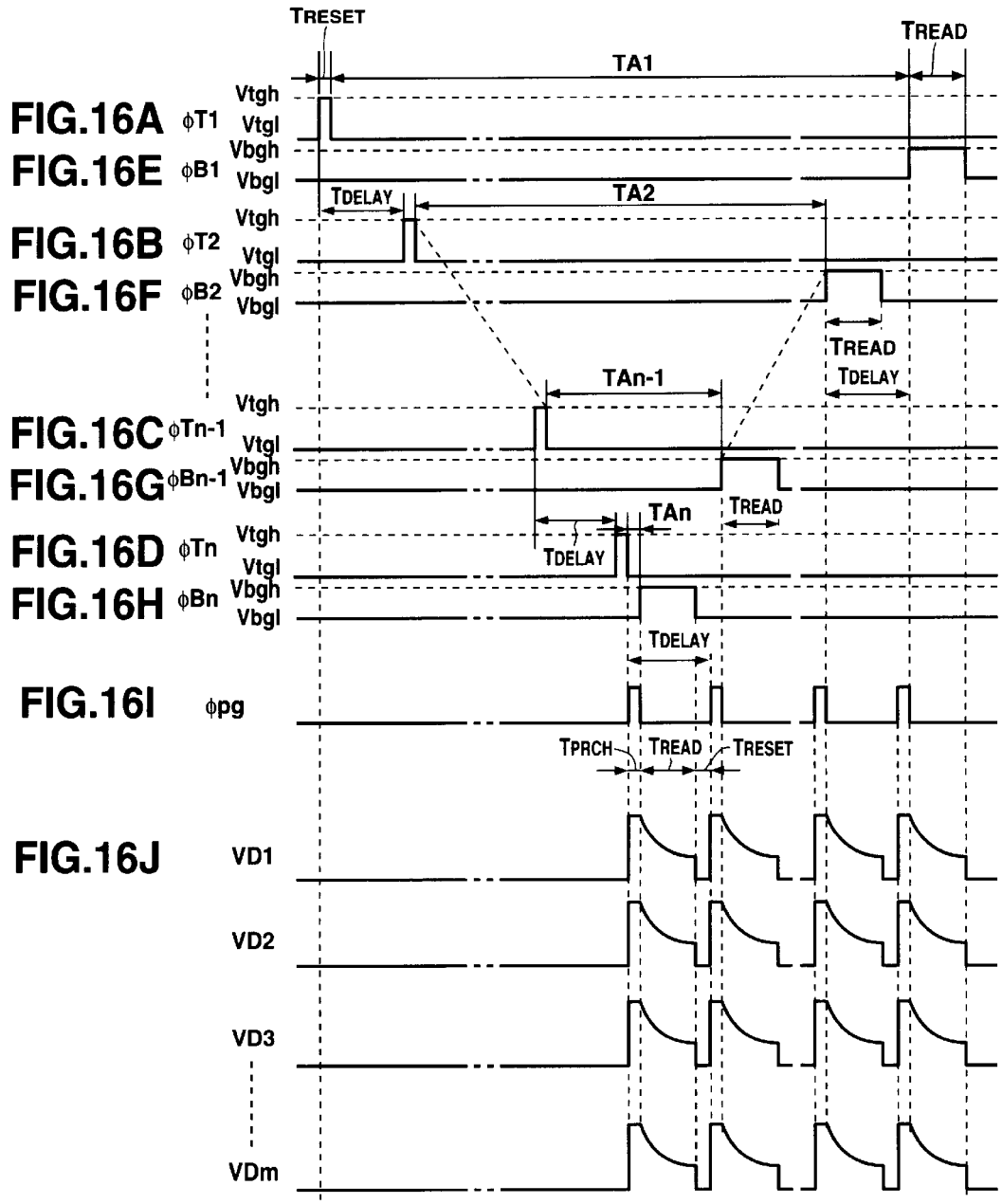

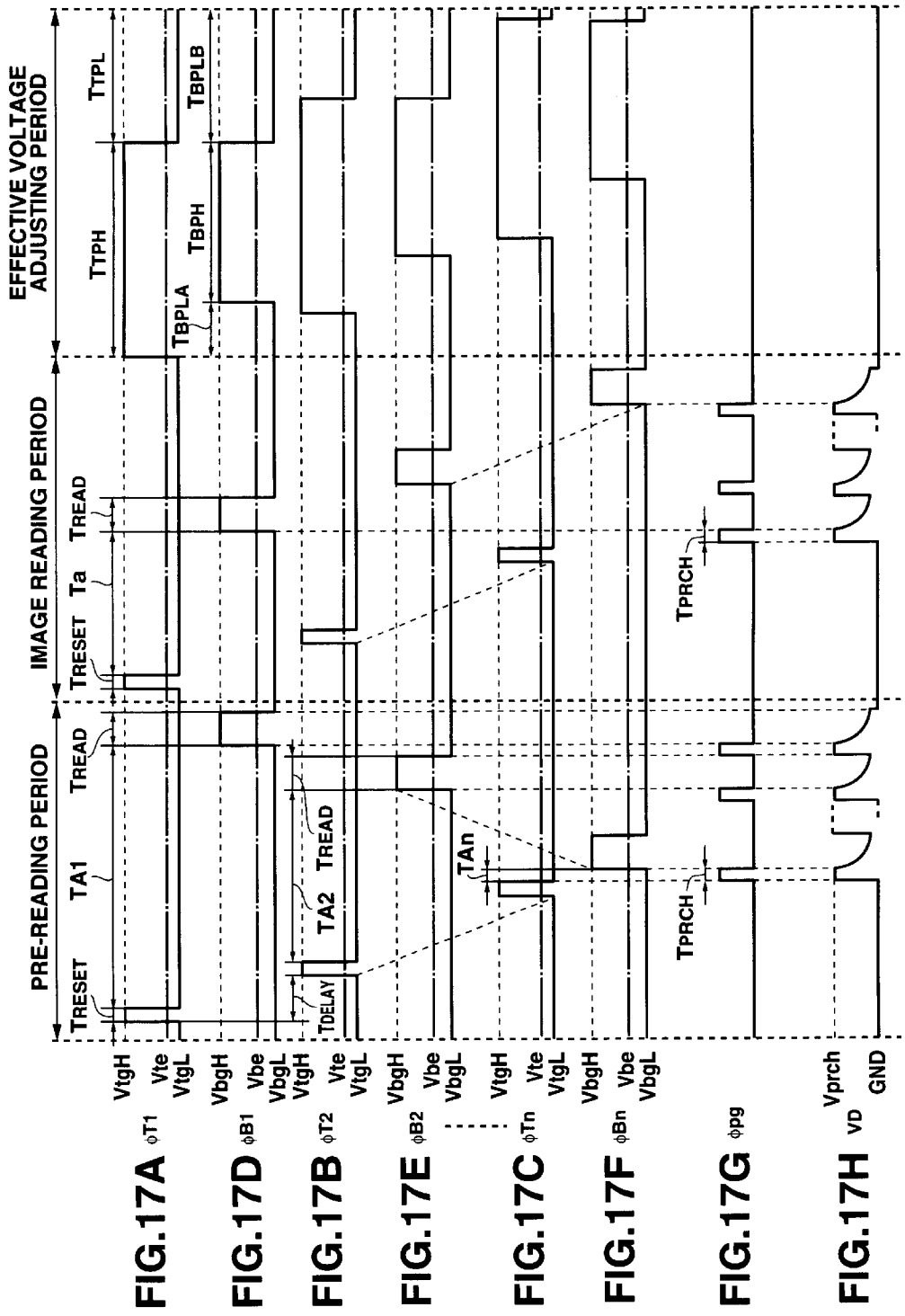

PRIOR ART

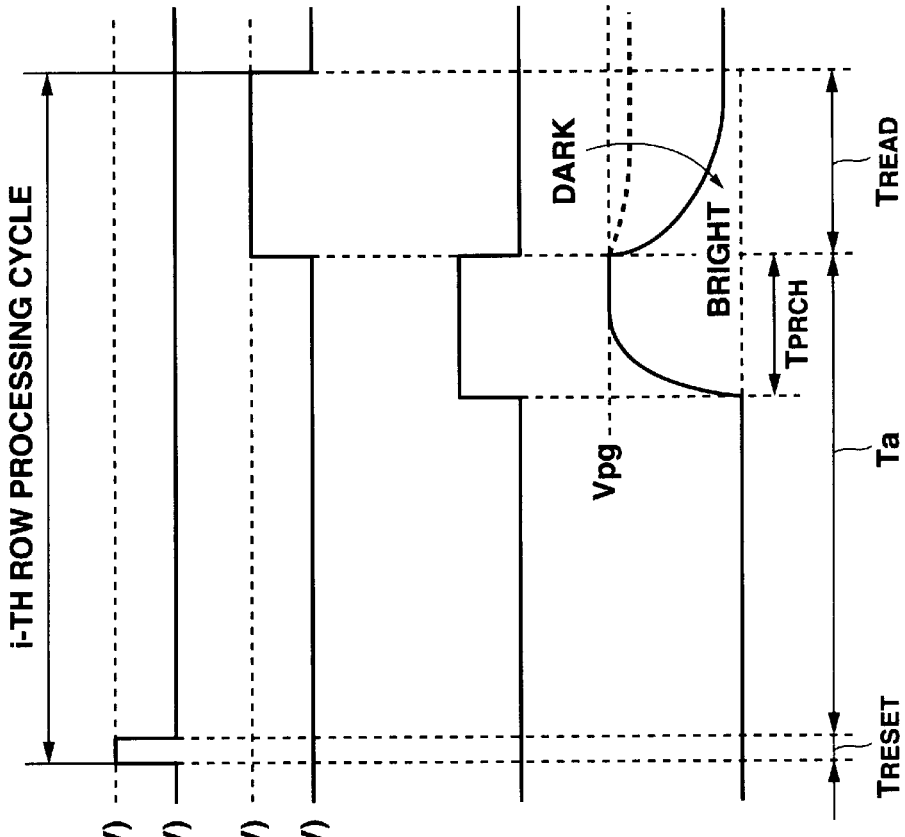

PHOTOSENSOR SYSTEM AND DRIVE CONTROL METHOD THEREOF

CROSS-REFERENCE TO RELATED APPLICATIONS

This application is based upon and claims the benefit of priority from the prior Japanese Patent Application No. 11-319859, filed Nov. 10, 1999, the entire contents of which are incorporated herein by reference.

BACKGROUND OF THE INVENTION

The present invention relates to a photosensor system having a photosensor array constituted by two-dimensionally arraying a plurality of photosensors, and a drive control method thereof.

As a conventional two-dimensional image reading apparatus for reading print, a photograph, or a fine three-dimensional pattern like a fingerprint, some structures have a photosensor array constituted by two-dimensionally arraying photosensors (light receiving elements) in a matrix. This photosensor array generally employs a solid-state imaging device such as a CCD (Charge Coupled Device).

As well known, the CCD has a structure in which photosensors such as photodiodes, or thin film transistors (TFT: Thin Film Transistor) are arranged in a matrix, and the charge amount of pairs of electrons and positive holes generated corresponding to the amount of light entering the light receiving section of each sensor is detected by a horizontal scanning circuit and vertical scanning circuit to detect the luminance of radiation.

In a photosensor system using such a CCD, it is necessary to provide each scanned photosensor with a selective transistor for causing the scanned photosensor to assume a selected state. This increases the system size as the number of pixels increases. To prevent this, a photosensor (to be referred to as a double-gate photosensor hereinafter) is now being developed, which is formed of a thin film transistor having a so-called double-gate structure and has both a photosensing function and selecting function.

FIG. 18A is a sectional view showing the structure of a double-gate photosensor 10. FIG. 18B is a circuit diagram showing the equivalent circuit of the double-gate photosensor 10. As shown in FIG. 18A, the double-gate photosensor 10 comprises a semiconductor layer 11 formed of amorphous silicon or the like in which pairs of electrons and positive holes are generated upon reception of visible light, $n^+$-silicon layers 17 and 18 respectively formed at the both ends of the semiconductor layer 11, source and drain electrodes 12 and 13 respectively formed on the $n^+$-silicon layers 17 and 18, a top gate electrode 21 formed above the semiconductor layer 11 via a block insulating film 14 and upper gate insulating film 15, and a bottom gate electrode 22 formed below the semiconductor thin film 11 via a lower gate insulating film 16. The double-gate photosensor 10 is provided on a transparent insulating substrate 19 formed of glass or the like. In FIG. 18A, the top gate electrode 21, the upper gate insulating film 15, the lower gate insulating film 16, and a protective insulating film 20 formed on the top gate electrode 21 are made of materials having high transmittances for visible light which excites the semiconductor layer 11. To the contrary, the bottom gate electrode 22 is made of a material which shields transmission of visible light, and has a structure of detecting only irradiation light incident from above the structure in FIG. 18A.

The double-gate photosensor 10 can be considered to be a structure which is formed, on the transparent insulating substrate 19 of glass or the like, from a combination of two MOS transistors using the semiconductor layer 11 as a common channel, i.e., an upper MOS transistor made up of the semiconductor layer 11, source electrode 12, drain electrode 13, and top gate electrode 21, and a lower MOS transistor made up of the semiconductor layer 11, source electrode 12, drain electrode 13, and bottom gate electrode 22. This double-gate photosensor 10 can generally be represented by an equivalent circuit as shown in FIG. 18B. In FIG. 18B, TG represents a top gate terminal; BG, a bottom gate terminal; S, a source terminal; and D, a drain terminal.

FIG. 19 is a schematic view showing a photosensor system constituted by two-dimensionally arraying double-gate photosensors. As shown in FIG. 19, the photosensor system is roughly constituted by a photosensor array 100 that is comprised of a large number of double-gate photosensors 10 arranged in an n×m matrix, top and bottom gate lines 101 and 102 that connect the top and bottom gate terminals TG and BG of the double-gate photosensors 10 in a row direction, top and bottom gate drivers 111 and 112 respectively connected to the top and bottom gate lines 101 and 102, data lines 103 that connect the drain terminals D of the double-gate photosensors in a column direction, and an output circuit section 113 connected to the data lines 103. $\phi tg$ and $\phi bg$ represent control signals for generating a reset pulse $\phi Ti$ and readout pulse $\phi Bi$, respectively, which will be described later, and $\phi pg$ represents a pre-charge pulse for controlling the timing at which a pre-charge voltage Vpg is applied.

In the above-described structure, the photosensing function is realized by applying a voltage from the top gate driver 111 to the top gate terminals TG, while the selecting/readout function is realized by applying a voltage from the bottom gate driver 112 to the bottom gate terminals BG, then sending a detection signal to the output circuit section of the output circuit section 113 via the data lines 103, and outputting serial data Vout.

FIGS. 20A to 20D are timing charts showing a method of controlling the photosensor system, and showing a detecting period (i-th row processing cycle) in the i-th row of the sensor array 100.

First, a high-level pulse voltage (reset pulse; e.g., Vtgh=+15V) $\phi Ti$ shown in FIG. 20A is applied to the top gate line 101 of the i-th row, and during a reset period $T_{reset}$, reset operation for discharging the double-gate photosensors 10 of the i-th row is executed.

Subsequently, a bias voltage $\phi Ti$ of low level (e.g., Vtgl=−15V) is applied to the top gate line 101, thereby finishing the reset period $T_{reset}$ and starting a charge accumulating period Ta in which the channel region is charged. During the charge accumulating period Ta, charges (positive holes) corresponding to the amount of light entering each sensor from the top gate electrode side are accumulated in the channel region.

Then, a pre-charge pulse $\phi pg$ with a pre-charge voltage Vpg shown in FIG. 20C is applied to the data lines 103 during part of the charge accumulating period Ta, and after a pre-charge period $T_{prch}$ for making the drain electrodes 13 keep charges, a bias voltage (readout pulse $\phi Bi$) of high level (e.g., Vbgh=+10V) shown in FIG. 20B is applied to the bottom gate line 102. Then, the double-gate photosensors 10 of the i-th row are turned on to start a readout period $T_{read}$.

During the readout period $T_{read}$, the charges accumulated in the channel region serve to moderate a low-level voltage (e.g., Vtgl=−15V) which has an opposite polarity of charges accumulated in the channel region and is applied to each top gate terminal TG. Therefore, an n-type channel is formed by the voltage Vbgh at each bottom gate terminal BG, the voltage VD at the data lines 103 gradually reduces in accordance with the drain current with lapse of time after the pre-charge voltage Vpg is applied. More specifically, the change trend of the voltage VD at the data lines 103 depends upon the charge accumulating period Ta and the amount of received light. As shown in FIG. 20D, the voltage VD tends to gradually reduce when the incident light is dark, i.e., a small amount of light is received, and hence only small charges are accumulated, whereas they tend to suddenly reduce when the incident light is bright, i.e., large amount of light is received, and hence large charges are accumulated. From this, it is understood that the amount of radiation can be calculated by detecting the voltage VD at the data lines 103 a predetermined period after the start of the readout period $T_{read}$, or by detecting a period required until the voltage VD reaches a predetermined threshold voltage.

Image reading is performed by sequentially executing the above-described drive control for each line of the sensor array 100, by executing drive control for each line in a parallel manner at different timings at which the driving pulses do not overlap.

Although the case of using the double-gate photosensor as a photosensor has been described above, even a photosensor system using a photodiode or phototransistor as a photosensor has operation steps: reset operation→charge accumulating operation→pre-charge operation→reading operation, and uses a similar drive sequence.

The conventional photosensor system as above has the following problems.

To read a subject image in various use environments in a photosensor system having a two-dimensional photosensor array as described above, the reading sensitivity must be properly set. The proper reading sensitivity changes in accordance with changes in ambient conditions such as the illuminance of external light in a use environment, and also changes when the characteristics of the photosensor change. In the prior art, a circuit for detecting the illuminance of external light must be additionally arranged. Alternatively, reading operation (pre-reading operation) of changing the reading sensitivity to a plurality of stages using a subject such as a normal sample before the start of normal reading operation of a subject image must be executed to obtain the optimal value of the reading sensitivity from the read result. However, a reading sensitivity setting method of uniquely and automatically setting a proper charge accumulating period based on a read result every charge accumulating period that is obtained by pre-reading operation has not been developed yet.

In addition, when the detection area of the photosensor array is larger than a subject such as a standard sample used in pre-reading operation, or a position where a subject is placed offsets from a normal position to fail to cover part of the detection area with the subject, an image read by pre-reading operation contains a background image together with a subject image. In this case, the image of the read background may influence image processing in obtaining the optimal value of the reading sensitivity, failing to set a proper reading sensitivity. If this photosensor system is applied to, e.g., a fingerprint reading apparatus, problems such as abnormal fingerprint authentication arise.

BRIEF SUMMARY OF THE INVENTION

It is an object of the present invention to provide a reading sensitivity setting method of uniquely and automatically setting a proper reading sensitivity on the basis of read results obtained immediately before the start of normal reading operation of a subject image in order to accurately read a subject image in various use environments in a photosensor system having a photosensor array constituted by two-dimensionally arraying a plurality of photosensors. It is another object of the present invention to prevent any malfunction in setting the reading sensitivity even when a position where a subject is placed in the detection area of the photosensor array offsets from a normal position in performing reading operation of a subject image for setting the sensitivity.

To achieve the above objects, a photosensor system according to the present invention comprises a photosensor array constituted by two-dimensionally arraying photosensors, a driver circuit for supplying a drive signal to the photosensors, a controller for controlling reading operation of a subject image and sensitivity setting, and a RAM for storing read image data, data relating to sensitivity setting processing, and the like.

A reading sensitivity setting method according to the present invention comprises reading image data of a subject by performing pre-reading operation while changing the image reading sensitivity at a plurality of stages for, e.g., respective rows immediately before the start of normal reading operation of a subject image, calculating the absolute difference value between adjacent pixels of lightness data for each image reading sensitivity, extracting a maximum absolute difference value for each image reading sensitivity from calculated absolute difference values, extracting an image reading sensitivity having a maximum representative difference value from extracted representative difference values for image reading sensitivities, and setting the extracted image reading sensitivity as an optimal reading sensitivity.

Even when ambient light changes or the characteristics of the photosensor change, an optimal image reading sensitivity can be set in accordance with the changes. Moreover, even when a position where a subject is placed in the detection area of the photosensor array offsets from a normal position in performing pre-reading operation, and the read image data contains a background pattern together with the subject image, the absolute difference value of lightness data between adjacent pixels can be used to discriminate the subject which is placed in tight contact with the photosensor array to allow clearly reading a bright/dark pattern from the background pattern in which the image is out of focus not to clearly read a bright/dark pattern. Thus, a proper image reading sensitivity can be extracted and set without any influence of the background pattern. An image reading sensitivity setting method having high reliability can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 9A and 9B are views each showing a sensitivity determination region for the image data of FIG. 8;

FIGS. 15A to 15J are timing charts showing the first embodiment of an image reading sensitivity setting method applied to pre-reading operation in the embodiment of the present invention;

FIGS. 16A to 16J are timing charts showing the second embodiment of an image reading sensitivity setting method applied to pre-reading operation in the embodiment of the present invention;

FIGS. 17A to 17H are timing charts showing an embodiment when an effective voltage adjusting period is set after pre-reading and image reading periods in a photosensor system drive control method according to the present invention;

FIGS. 20A to 20D are timing charts showing a conventional drive method for the double-gate photosensor system.

DETAILED DESCRIPTION OF THE INVENTION

A photosensor system and drive control method thereof according to the present invention will be described in detail with reference to the several views of the accompanying drawing.

Although a double-gate photosensor is applied as a photosensor in the following embodiment, the present invention is not limited to the double-gate photosensor, but is also applicable to a photosensor system using another type of photosensor.

Figure 1:
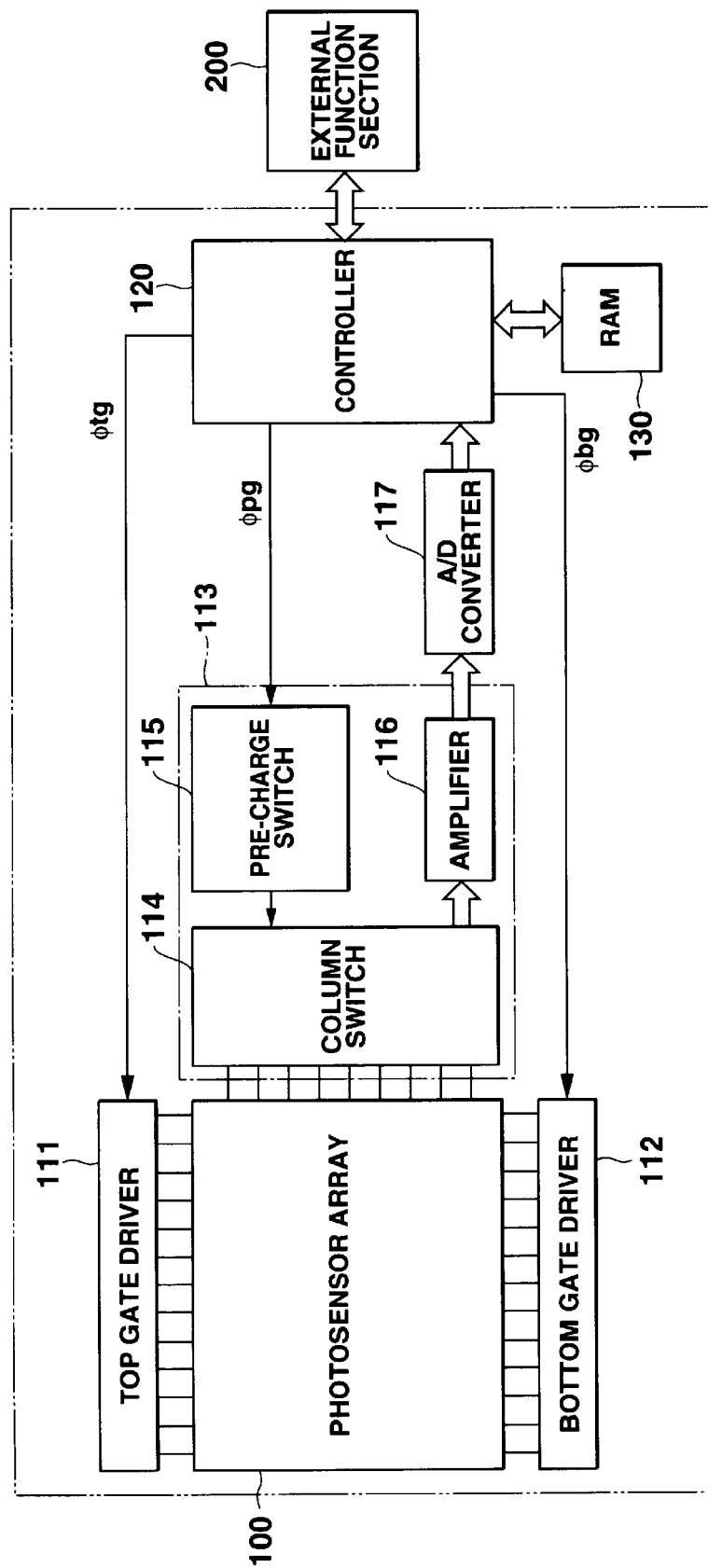
FIG. 1 is a block diagram showing an arrangement of a photosensor system according to the present invention.
Figure 18A:
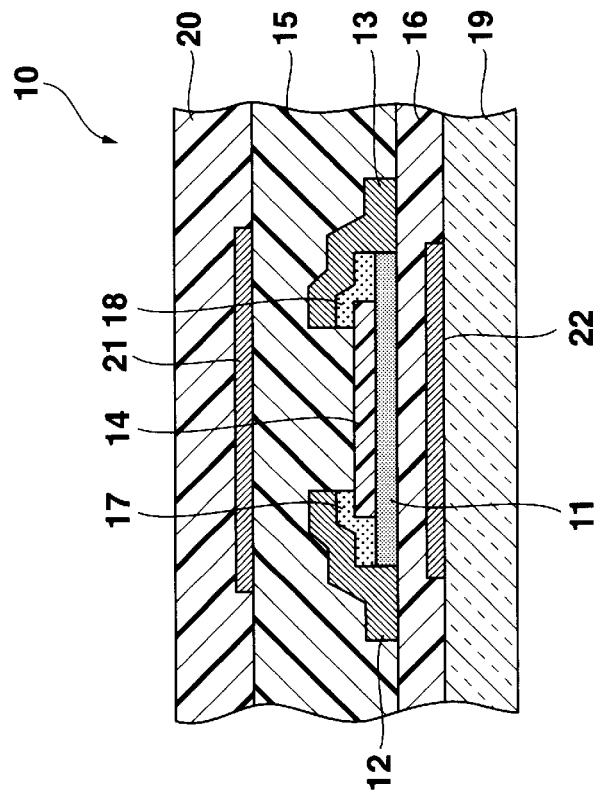
FIG. 18A is a sectional view showing the structure of a double-gate photosensor.
Figure 18B:
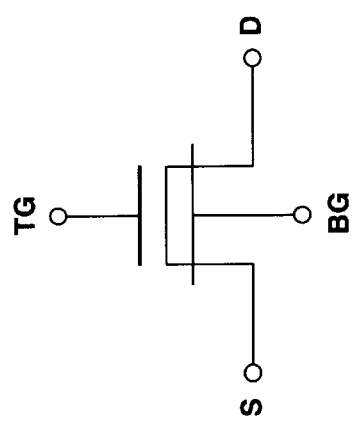
FIG. 18B is an equivalent circuit diagram showing the double-gate photosensor.

FIG. 1 is a block diagram showing an arrangement of a photosensor system according to the present invention. The double-gate photosensor shown in FIG. 18A is used, and the arrangement of the photosensor system shown in FIG. 19 will be referred to if necessary. The same reference numerals as in the photosensor system shown in FIG. 19 denote the same parts.

As is shown in FIG. 1, a sensitivity adjustment apparatus for the photosensor system according to an embodiment comprises a photosensor array 100 constituted by two-dimensionally arraying double-gate photosensors 10 shown in FIG. 18A, a top gate driver 111 for applying a predetermined reset pulse to a top gate terminal TG of each double-gate photosensor 10 at a predetermined timing, a bottom gate driver 112 for applying a predetermined readout pulse to a bottom gate terminal BG of each double-gate photosensor 10 at a predetermined timing, an output circuit section 113 made up of an amplifier 116 and a column switch 114 and pre-charge switch 115 for reading a data line voltage and applying a pre-charge voltage to each double-gate photosensor 10, respectively, an analog/digital converter (to be referred to as an A/D converter hereinafter) 117 for converting the read data voltage as an analog signal into image data as a digital signal, a controller 120 which is adopted to control the operation of reading a subject image by the photosensor array 100, and to exchange data with an external function section 200, and which controls sensitivity setting in the present invention, and a RAM 130 that stores, for example, read image data, data relating to sensitivity adjustment processing described later.

Figure 19:
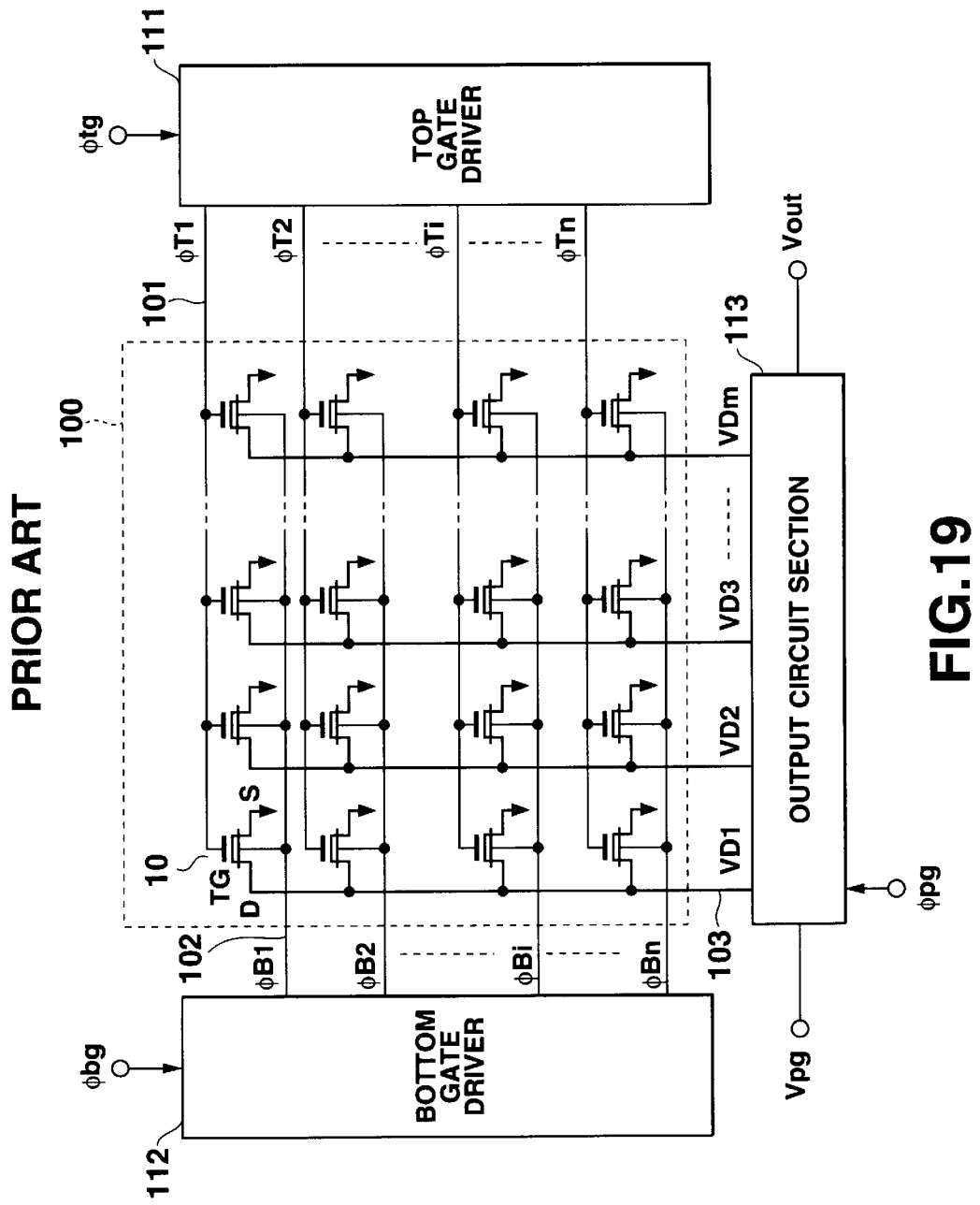
FIG. 19 is a schematic view showing a photosensor system constituted by two-dimensionally arraying double-gate photosensors.

The structure including the photosensor array 100, top gate driver 111, bottom gate driver 112, and output circuit section 113 is the same as and has the same function as the photosensor system shown in FIG. 19. Further, this embodiment adopts the A/D converter 117, controller 120, and RAM 130 to realize a function of performing sensitivity setting control (to be described later).

The controller 120 in this embodiment outputs predetermined control signals φtg and φbg to the top and bottom gate drivers 111 and 112, respectively, which, in turn, output predetermined drive signal voltages (reset pulse and readout pulse) to the top and bottom gate terminals TG and BG of each double-gate photosensor of the photosensor array 100, respectively. The controller 120 also outputs a predetermined control signal φpg to the pre-charge switch 115 to apply a pre-charge voltage to the data line and control execution of the operation of reading a subject image. The controller 120 has a function of receiving image data prepared by converting a data line voltage read out from the double-gate photosensor 10 into a digital signal via the amplifier 116 and A/C converter 117, executing predetermined image processing for image data, writing or reading image data into or from the RAM 130, and interfacing with the external function section 200 that executes predetermined processing such as image data identification, modification, and the like. The controller 120 has another function of properly controlling control signals to be output to the top and bottom gate drivers 111 and 112 to set an optimal reading sensitivity capable of optimally reading a subject image in accordance with ambient environments such as the illuminance of external light, i.e., an optimal charge accumulating period for each double-gate photosensor 10.

The arrangement of the controller applied to this embodiment, and its sensitivity setting operation will be explained in more detail with reference to the several views of the accompanying drawing.

Figure 2:
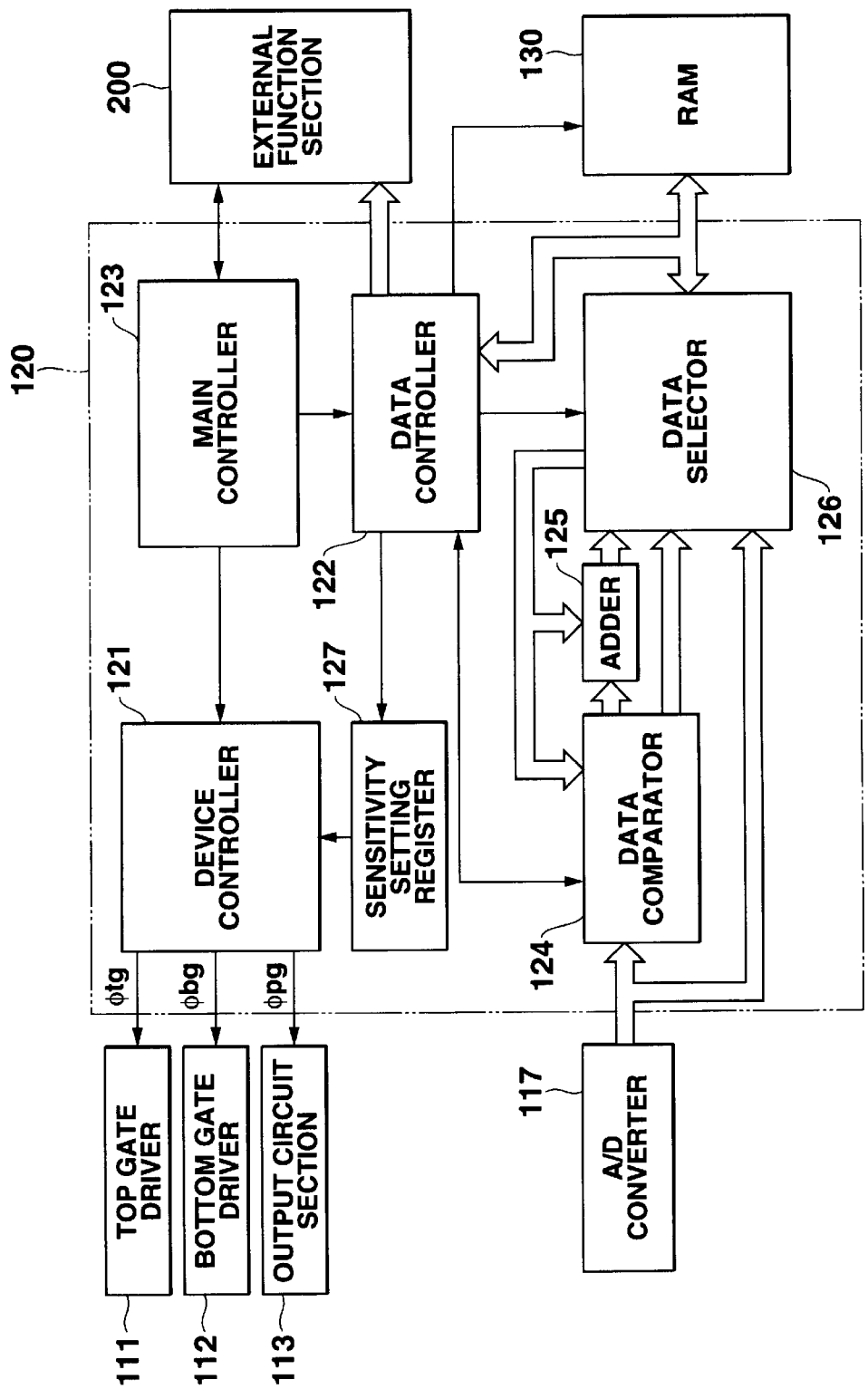
FIG. 2 is a block diagram showing an arrangement of a controller applied to an embodiment of the present invention.

FIG. 2 is a block diagram showing an arrangement of the controller applied to this embodiment. As shown in FIG. 2, the controller 120 in this embodiment comprises a device controller 121 for controlling the top gate driver 111, bottom gate driver 112, and output circuit section 113, a data controller 122 for managing various data such as image data, write data, and readout data to the RAM 130, and a main controller 123 which supervises the device and data controllers 121 and 122 and interfaces with the external function section 200.

The controller 120 further comprises a data comparator 124 and adder 125 for receiving as a digital signal from the photosensor array 100 via the A/D converter 117 image data formed from a pixel corresponding to each photosensor constituting the photosensor array 100, calculating the absolute value of the difference of specific measurement data between adjacent pixels of this image data, and extracting the absolute value of the largest difference, a data selector 126 for receiving processed image data or measurement data via the A/D converter 117, data comparator 124, and adder 125, and switching write/readout in/from the RAM 130, re-input to the data comparator 124 and adder 125, and output to the external function section via the data controller 122 in accordance with the received data, and a sensitivity setting register 127 for changing control signals to be output from the device controller 121 to the top and bottom gate drivers 111 and 112 so as to optimize the reading sensitivity of the photosensor array on the basis of a control signal from the data controller 122.

The operation of this embodiment in the drive control method of the photosensor system using the above controller will be explained with reference to FIG. 3.

Figure 3:
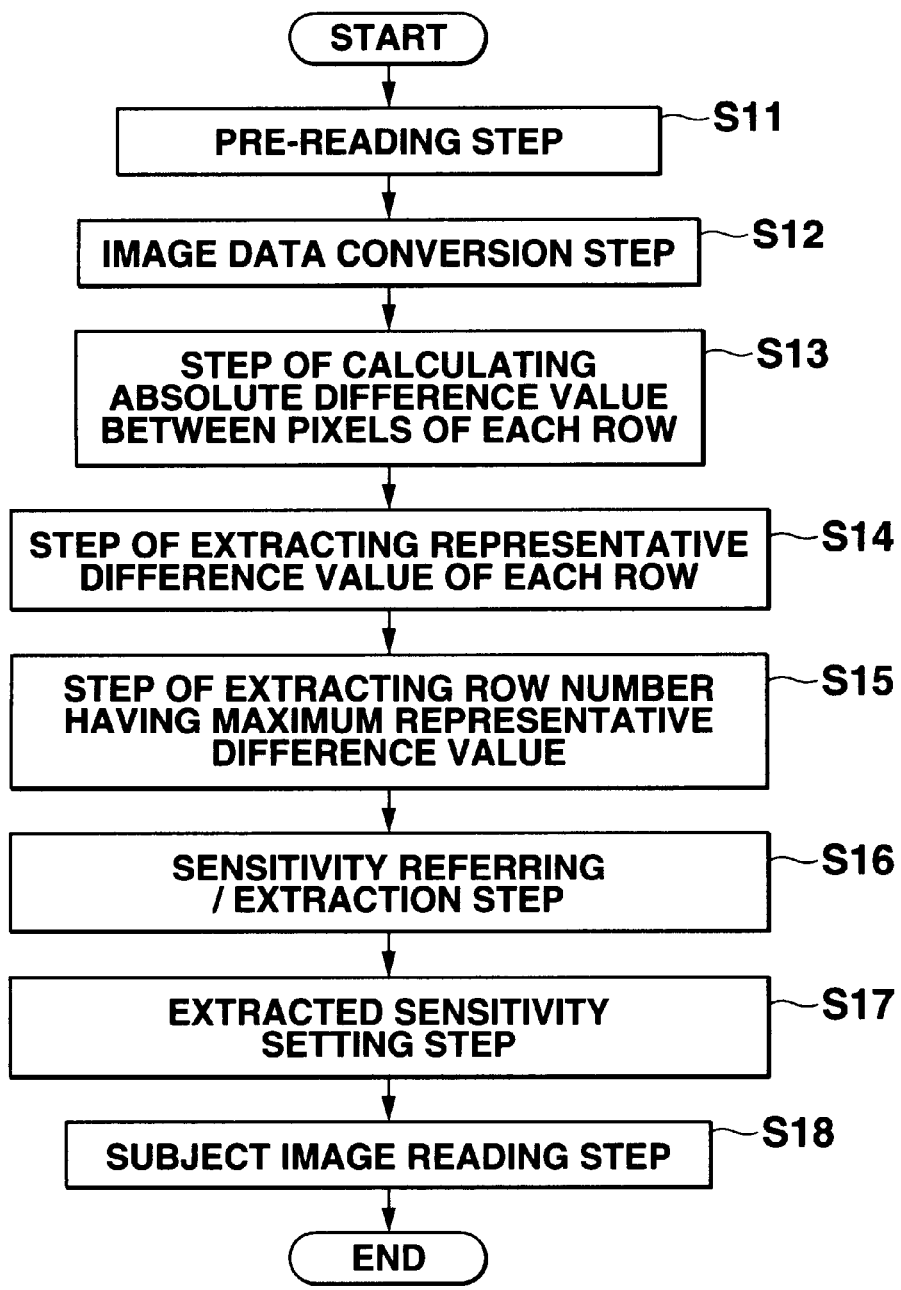
FIG. 3 is a flow chart showing the operation of the embodiment of the present invention.

FIG. 3 is a flow chart showing an operation up to read of a subject image with an optimal sensitivity according to the embodiment. This operation will be described by properly referring to the arrangement of the photosensor system shown in FIGS. 1 and 2.

In S11 (pre-reading step) of FIG. 3, the main controller 123 starts pre-reading operation prior to normal reading operation of a subject image. The main controller 123 controls to set an image reading sensitivity for pre-reading operation in the sensitivity setting register 127 via the data controller 122, and pre-reads a subject image. Similar to normal image reading operation, pre-reading operation is done by executing a series of processes: reset operation→light accumulating operation→pre-charge operation→readout operation.

The image reading sensitivity of pre-reading operation is changed stepwise for, e.g., respective rows of a subject image so as to read one subject image at a plurality of different sensitivities. The image reading sensitivities of respective rows are stored in the RAM 130 in, e.g., a table format (row number vs. image reading sensitivity correspondence table) in correspondence with row numbers. A detailed setting method of the image reading sensitivity will be described later.

In S12 (image data conversion step) of FIG. 3, the image data read by pre-reading operation is converted into a digital signal via the amplifier 116 and A/D converter 117, and input as lightness data corresponding to the bright/dark pattern of the subject image to the data comparator 124. In this case, the lightness data is expressed by, e.g., 256 gray levels obtained by dividing the level of a subject image between white and black into 256 levels.

In S13 (step of calculating the absolute difference value between pixels of each row) of FIG. 3, the magnitudes of adjacent pixels are compared for each row on the basis of the lightness data input to the data comparator 124. Based on the magnitude relationship, the adder 125 sequentially calculates the absolute values of differences (to be referred to as absolute difference values hereinafter) of lightness data between pixels of each row. Calculation of the absolute difference value is executed for all the pixels or a predetermined column range of each row, and all the rows or a predetermined row range.

In S14 (step of extracting the representative difference value of each row) of FIG. 3, calculated absolute difference values of each row are input to the data comparator 124 again to extract the maximum value (to be referred to as a representative difference value) of the absolute difference value of each row. The representative difference value is stored in the RAM 130 via the data selector 126. Extraction processing of the representative difference value is executed for all the pixels or a predetermined column range of each row, and all the rows or a predetermined row range that have undergone calculation of the absolute difference value.

In S15 (step of extracting a row number having the maximum representative difference value) of FIG. 3, the representative difference values of respective rows stored in the RAM 130 are read out via the data selector 126, and input to the data comparator 124 again to extract the maximum representative difference value (to be referred to as a maximum difference value) among the representative difference values of respective rows. A row number having the maximum difference value is extracted.

In S16 (sensitivity referring/extraction step) of FIG. 3, the row number vs. image reading sensitivity correspondence table stored in the RAM 130 is looked up based on the row number having the maximum difference value, and an image reading sensitivity, i.e., charge accumulating period set for this row is extracted.

In S17 (extracted sensitivity setting step) of FIG. 3, the main controller 123 rewrites the sensitivity setting register 127 via the data controller 122 to set the extracted image reading sensitivity.

In S18 (subject image reading step) of FIG. 3, normal reading operation of a subject image is executed at the extracted image reading sensitivity set in the sensitivity setting register 127.

An example of applying the photosensor system drive control method using the above-described controller to a fingerprint reading apparatus will be described with reference to the several views of the accompanying drawing.

Figure 4:
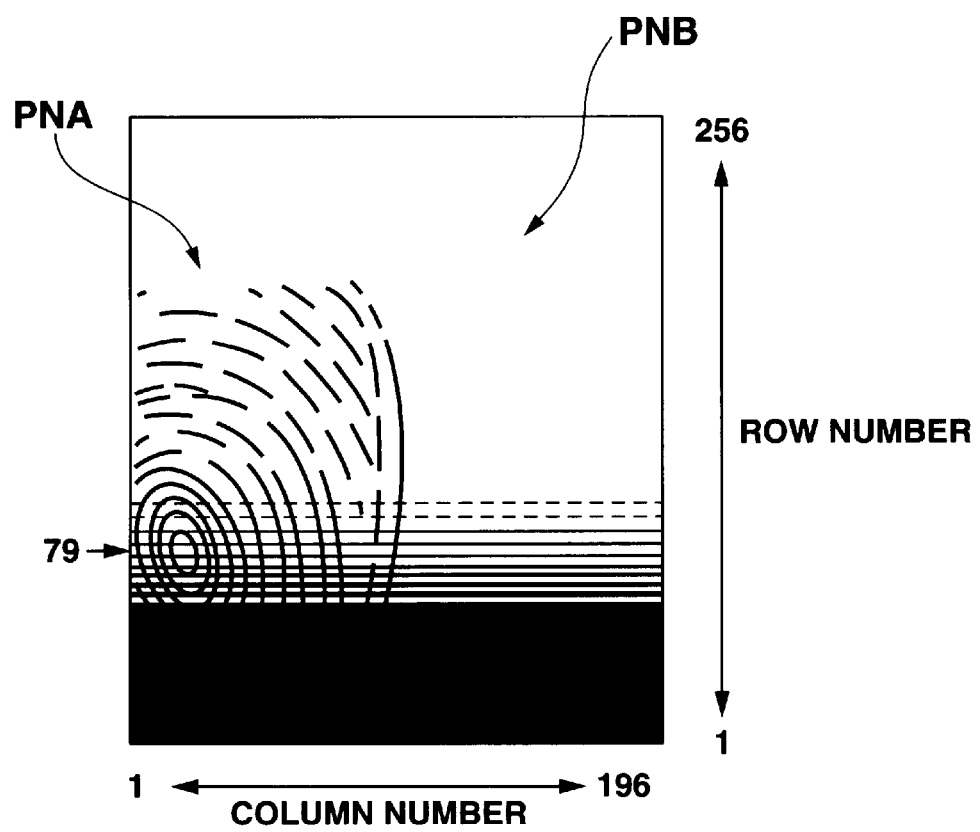
FIG. 4 is a view showing an example of image data of a read fingerprint image when a finger touches a fingerprint reading surface with an offset to the left in FIG. 4 in pre-reading operation in the embodiment of the present invention.
Figure 5A:
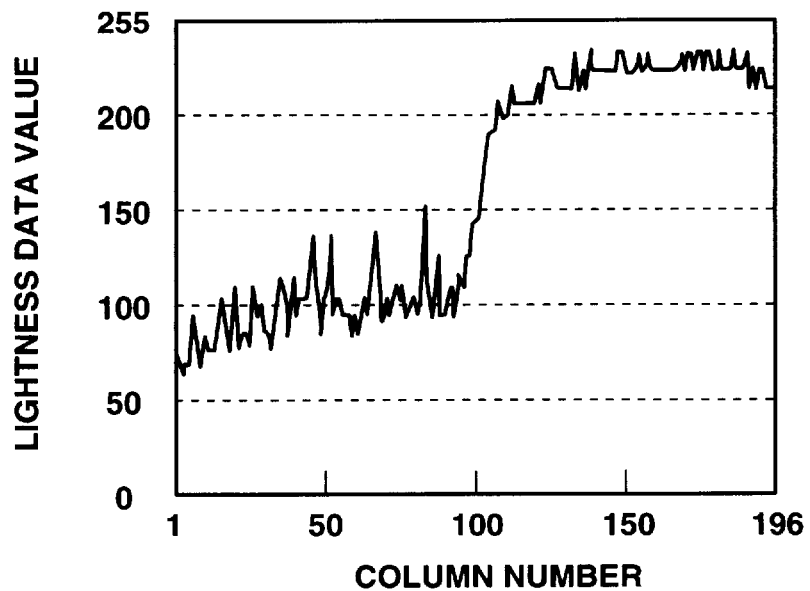
FIG. 5A is a graph showing changes in lightness data of respective pixels on a specific row of image data obtained by pre-reading operation.
Figure 5B:
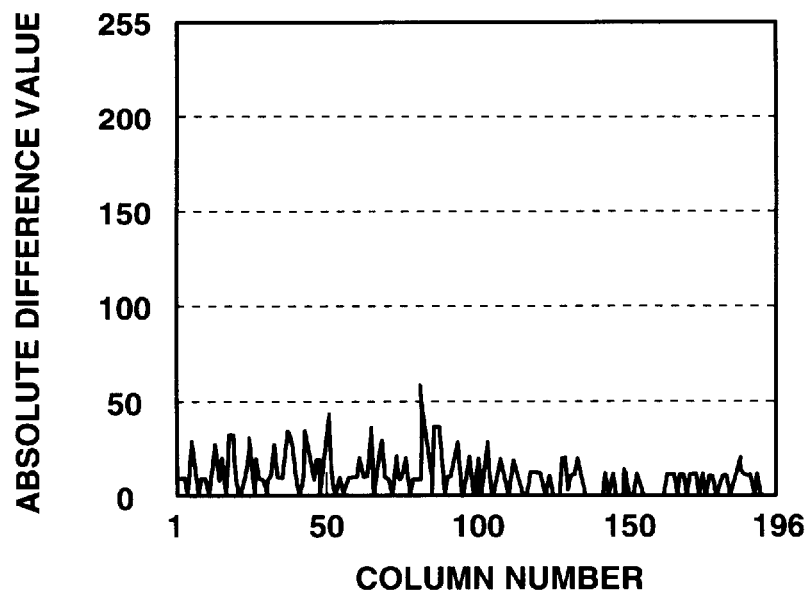
FIG. 5B is a graph showing changes in the absolute difference value between adjacent pixels in the lightness data of FIG. 5A.
Figure 6:
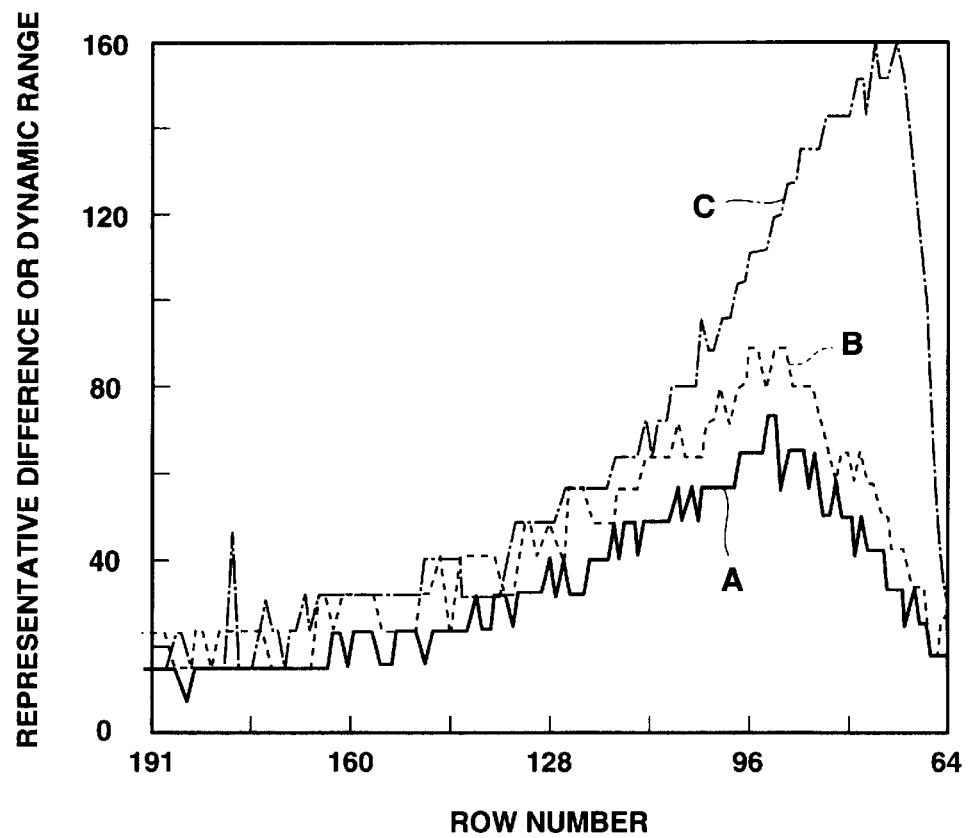
FIG. 6 is a graph showing changes in the representative difference values of lightness data of respective rows of image data obtained by pre-reading operation, and changes in the dynamic ranges of lightness data of respective rows.
Figures 7A, 7B:
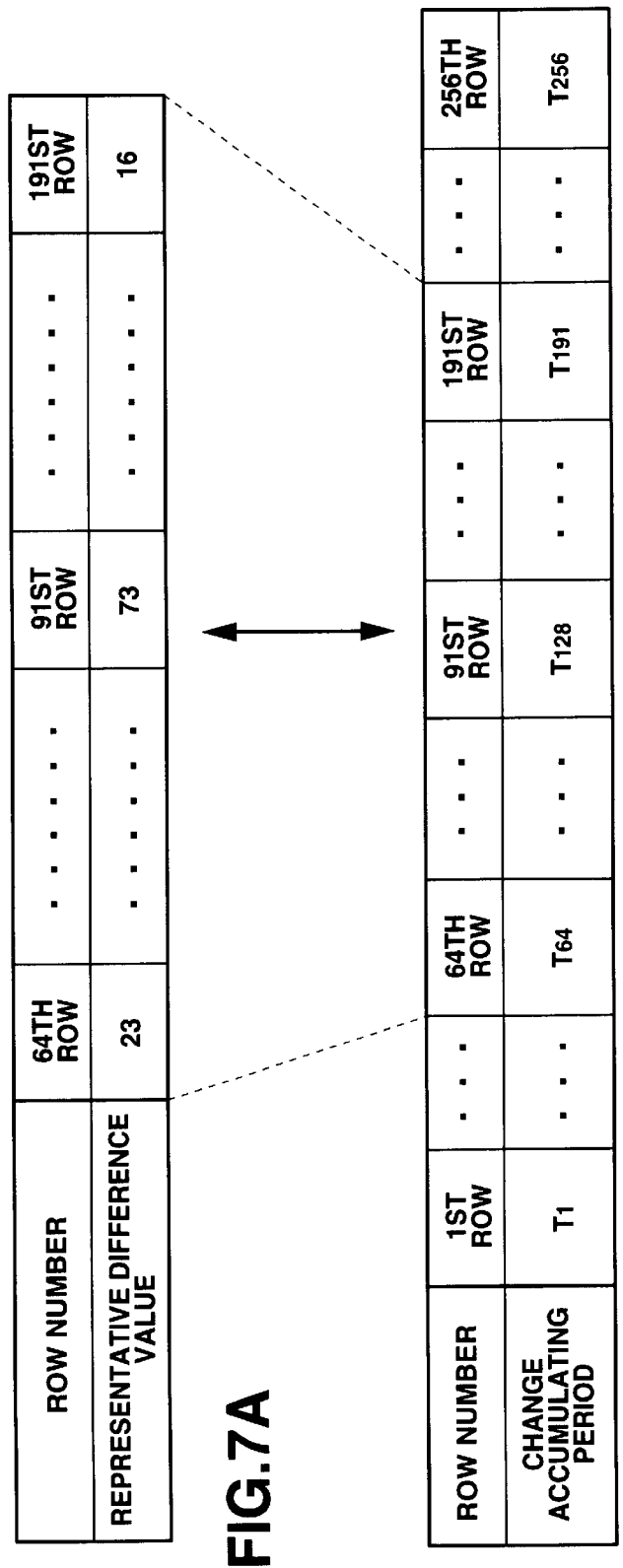
FIG. 7A is a view for illustrating a table showing the representative difference value of lightness data of each row of image data obtained by pre-reading operation.
FIG. 7B is a view for illustrating a table showing a row number vs. image reading sensitivity correspondence table in pre-reading operation.

FIG. 4 is a view showing an example of image data when a subject image is read while the image reading sensitivity is changed stepwise for respective rows in pre-reading operation. As will be described below, the present invention has an effect of performing accurate reading sensitivity setting even when a finger as a subject touches a fingerprint reading surface with an offset from the center, and a peripheral background image is simultaneously read as a read image. As shown in FIG. 4, a case wherein the finger as a subject touches the fingerprint reading surface with an offset to the left in FIG. 4 will be described. In FIG. 4, PNA represents a read fingerprint image; and PNB, an image other than the fingerprint image in the read image data, i.e., an image component (to be referred to as a background pattern) generated by the shadow of the edge of the finger or disturbance light from the background. FIG. 5A is a graph showing changes in lightness data of respective pixels on a specific row in image data obtained by pre-reading operation shown in FIG. 4, and FIG. 5B is a graph showing changes in the absolute difference value between adjacent pixels in the image data shown in FIG. 5A. FIG. 6 is a graph showing the relationship between changes in the maximum values (representative difference values) of the absolute difference values of respective rows for respective rows, and changes in the dynamic ranges (differences between maximum and minimum lightness data) of lightness data of respective rows. FIG. 7A is a view for illustrating a table showing the representative difference value of lightness data of each row obtained by pre-reading operation, and FIG. 7B is a view for illustrating a table showing a row number vs. image reading sensitivity correspondence table so as to represent their correspondence.

Assume that image data of a fingerprint is read out in correspondence with the layout of photosensors constituting the photosensor array 100, for example, in units of matrices corresponding to the pixel layout of 256 rows×196 columns. A larger lightness data value represents a brighter image, and a smaller lightness data value represents a darker image.

In pre-reading operation, the image reading sensitivity is set higher (charge accumulating period is set longer) for a larger row number (upward in FIG. 4), and lower (charge accumulating period is set shorter) for a smaller row number (downward in FIG. 4). In FIG. 4, as the row number increases, the ridge/valley pattern of the fingerprint image PNA becomes weaker under the influence of external light, and at last is read as an almost invisibly bright image. On the other hand, as the row number decreases, the ridge/valley pattern of the fingerprint image PNA becomes darker, and at last is read as an almost invisibly dark image.

As described above, the finger as a subject touches the fingerprint reading surface with an offset to the left in FIG. 4. The fingerprint reading apparatus is assumed to be used in a relatively bright environment, and the background pattern PNB is much brighter than the fingerprint image of the subject.

In image data shown in FIG. 4, for example, lightness data of all the pixels (1st to 196th columns) of the 79th row are extracted and plotted as shown in FIG. 5A. In a range of almost the 1st to 95th columns where the ridge/valley pattern of the fingerprint image PNA is relatively clearly read, the lightness data exhibits an almost intermediate value (about 100), and the lightness data between columns (i.e., pixels) relatively greatly changes. To the contrary, in a range of almost 96th to 196th columns where no finger is placed and the background pattern PNB is read, the lightness data exhibits an excessively large value (about 220 to 230) in almost all the columns, and the lightness data between columns (pixels) does not greatly change.

From this lightness data distribution shown in FIG. 5A, the absolute difference values between adjacent pixels are calculated and plotted as shown in FIG. 5B. In a range of almost the 1st to 95th columns where the ridge/valley pattern of the fingerprint image PNA is relatively clearly read, the absolute difference value exhibits a large value (about 30) in almost all the columns. In a range of almost 96th to 196th columns where the background pattern PNB is read, the absolute difference value exhibits a small value (about 10) in almost all the columns. That is, in a region of the read image data where the finger is placed, a bright/dark pattern corresponding to the ridge/valley pattern of the fingerprint image PNA is clear, and thus the displacement of lightness data between adjacent pixels is large. In the background where no finger is placed and a region of the background pattern PNB corresponding to the boundary between the finger and the background, a subject to be detected is apart from the photosensor. Thus, the image is out of focus, the bright/dark pattern is obscure, and the displacement of lightness data between adjacent pixels is small.

Processing of extracting the maximum absolute difference value (representative difference value) from absolute difference values between adjacent pixels shown in FIG. 5B is executed for a predetermined row/column range (e.g., a region of 64th to 191st rows and 67th to 130th columns). Extracted representative difference values are plotted as represented by a solid line A in FIG. 6.

A broken line B in FIG. 6 represents the dynamic range distribution of lightness data of respective rows within the same row/column range when the finger normally touches the center of the fingerprint reading surface. This distribution exhibits the maximum peak value around the 90th to 95th rows. A chain line C in FIG. 6 represents the dynamic range distribution of lightness data in a wider column range (e.g., a region of 1st to 196th columns; to be described later) for respective rows when the finger is similarly normally placed. This distribution exhibits the maximum peak around the 71st to 75th rows.

Of these distributions, as will be described below, the dynamic range distribution represented by C (chain line) contains image data of the background pattern PNB around the fingerprint image, and is different from the dynamic range distribution of only the fingerprint image. The dynamic range distribution represented by B (broken line) does not contain any image data of the background, and represents the dynamic range distribution of only the fingerprint image. With respect to these distributions, the distribution of the representative difference values of respective rows represented by A (solid line) in FIG. 6 exhibits a peak position very close to that of the dynamic range distribution represented by B (broken line). As will be described later, a row in which the dynamic range of lightness data maximizes in a fingerprint image not containing any image data of the background pattern is determined to be a row having an optimal image reading sensitivity. Thus, the contrast of image data can be estimated based on the distribution of the representative difference values of respective rows in lightness data between adjacent pixels of respective rows in which a peak position corresponds to the peak position of the dynamic range of lightness data. In other words, image data of a row (e.g., 91st row) having the maximum representative difference value (maximum difference value) among the representative difference values of respective rows can be determined as image data having a fine contrast corresponding to the ridge/valley pattern of the fingerprint. This row can be determined to have an optimal image reading sensitivity.

The RAM 130 stores the row number vs. image reading sensitivity correspondence table shown in FIG. 7B, and stores the image reading sensitivities, i.e., charge accumulating periods $T_1$ to $T_{256}$ of respective rows.

This row number vs. image reading sensitivity correspondence table is looked up for the 91st row having the maximum difference value to acquire an image reading sensitivity, i.e., charge accumulating period $T_{91}$ set for the 91st row as an optimal value.

An image of the subject (fingerprint) can be read during the acquired charge accumulating period $T_{91}$ to accurately read the image.

The effectiveness of the sensitivity setting method of the photosensor system according to this embodiment will be explained in more detail with reference to the several views of the accompanying drawing as compared with another method.

Another method of setting the optimal sensitivity of the photosensor will be explained by exemplifying a case wherein pre-reading operation of changing the image reading sensitivity stepwise for respective rows and reading one image of a subject at a plurality of different image reading sensitivities is executed, a row having the maximum dynamic range of lightness data is extracted based on the obtained image data, and an image reading sensitivity set for the extracted row is determined as an optimal value. Further, the difference of the operation effects from the sensitivity adjustment method of the photosensor system according to this embodiment will be described.

Figure 8:
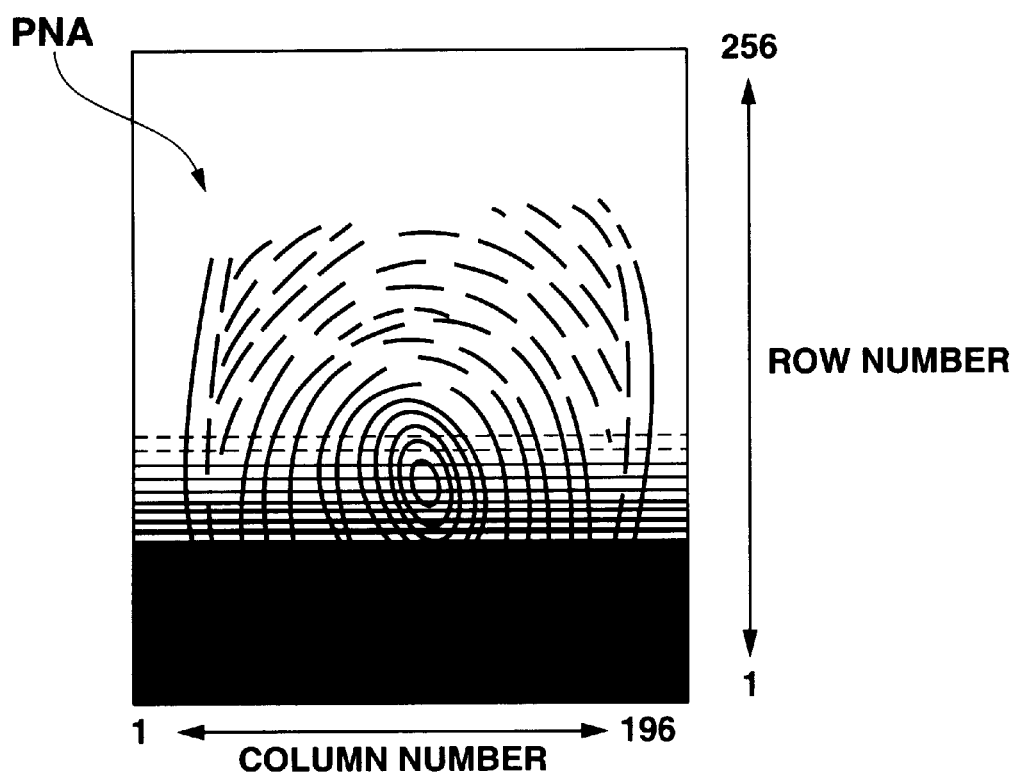
FIG. 8 is a view showing an example of image data of a read fingerprint image when a finger normally touches almost the center of the fingerprint reading surface in pre-reading operation.

The distribution characteristics of the dynamic ranges of lightness data of respective rows in pre-reading operation when the finger normally touches almost the center of the fingerprint reading surface will be explained. FIG. 8 is a view showing an example of image data when a subject image is read while the image reading sensitivity is changed stepwise for respective rows in pre-reading operation. FIGS. 9A and 9B are views each showing a sensitivity determination region for the image data obtained by pre-reading operation in FIG. 8. The sensitivity determination range used to extract a row having an optimal sensitivity in image data read in advance at different sensitivities for respective rows when the finger normally touches almost the center of the fingerprint reading surface does not contain any peripheral background image, and is preferably limited to a region having a fine contrast corresponding to the ridge/valley pattern of the fingerprint image PNA. From this, the sensitivity determination range is set to, e.g., a row/column range of 64th to 191st rows and 67th to 130th columns, as shown in FIG. 9A, or to, e.g., a row range of 64th 191st rows, as shown in FIG. 9B.

Figure 10:
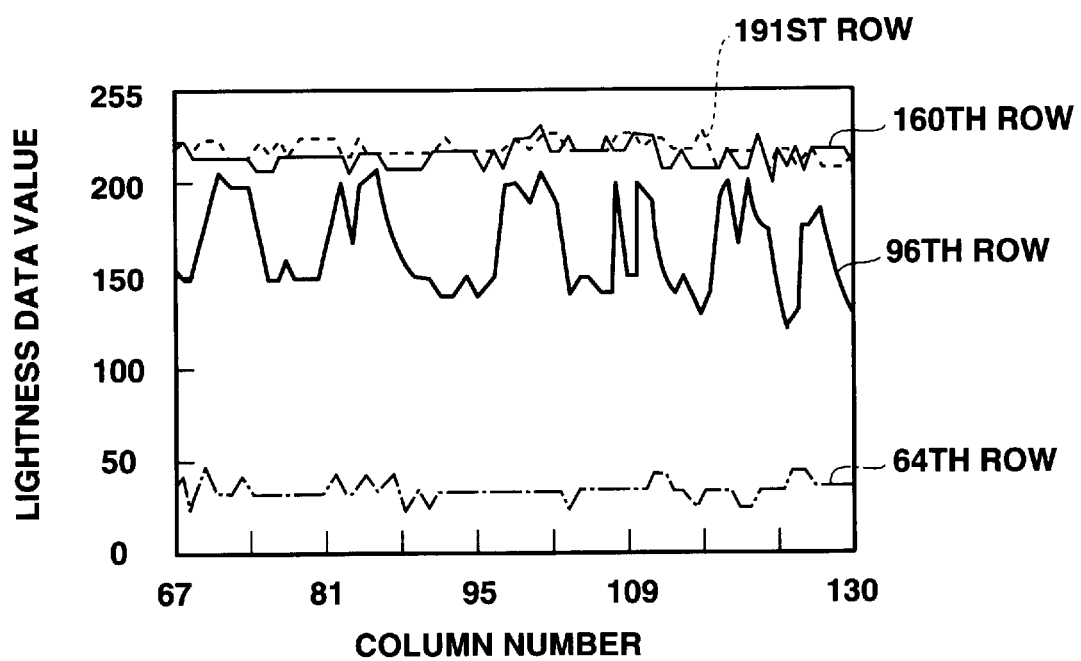
FIG. 10 is a graph showing changes in lightness data of specific rows of image data obtained by pre-reading operation within the sensitivity determination range shown in FIG. 9A.
Figure 11:
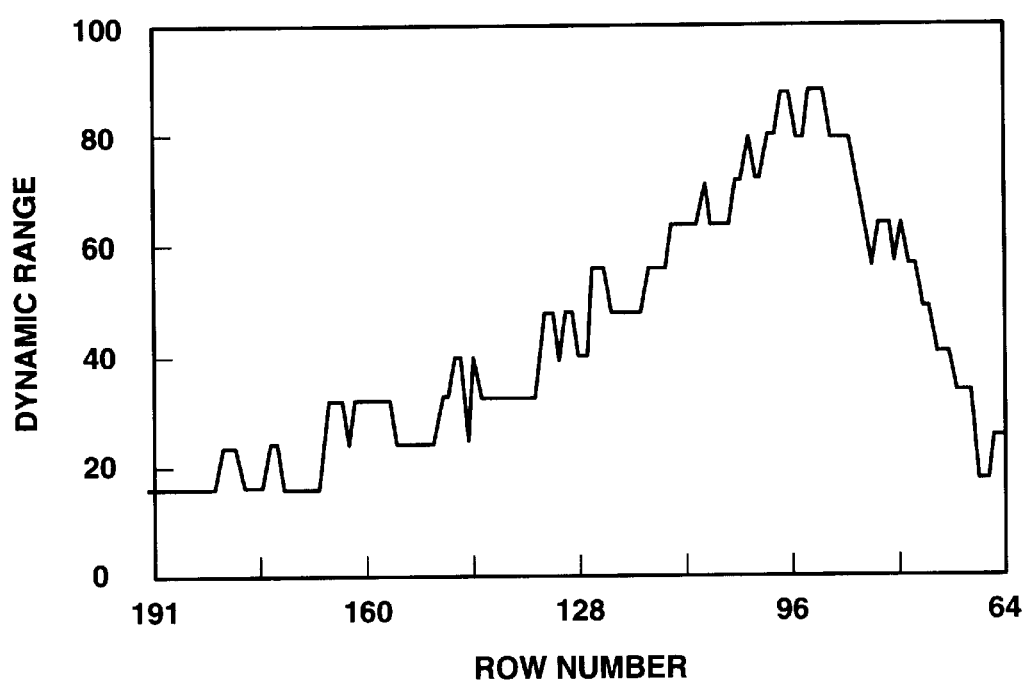
FIG. 11 is a graph showing the dynamic range distribution of lightness data of respective rows of image data, obtained by pre-reading operation, within the sensitivity determination range shown in FIG. 9A.

FIG. 10 is a graph showing changes in lightness data of specific rows within the sensitivity determination range shown in FIG. 9A. FIG. 11 is a graph showing the dynamic range distribution of lightness data of respective rows within the same sensitivity determination range. As shown in FIG. 10, in the 191st row (represented by the broken line in FIG. 10) and 160th row (represented by the thin line in FIG. 10) within the row range, the sensitivity is set high, and lightness data converges to a large value (about 220 to 225) and hardly provides any information (bright/dark pattern) as image data. In the 96th row (represented by the thick line in FIG. 10), lightness data does not converge to either the upper or lower limit value in all the columns, and exhibits a relatively large vertical displacement corresponding to the bright/dark pattern of image data. In the 64th row (represented by the chain line in FIG. 10), the sensitivity is set low, so that lightness data converges to a small value (about 35) and hardly provides any information as image data.

Maximum and minimum values are extracted based on changes in the lightness data distribution of each row shown in FIG. 10, and the dynamic range is calculated from the difference. Calculated dynamic ranges are plotted for rows to attain a distribution as shown in FIG. 11. In FIG. 11, it can be considered that image data (bright/dark pattern) is clearly read out in rows (almost 90th to 95th rows) having large dynamic ranges. From this, it can be determined that lightness data of almost the 90th to 95th rows are image data having a fine contrast corresponding to the ridge/valley pattern of a fingerprint, and an optimal image reading sensitivity is set. By referring to the image reading sensitivity set for each row in pre-reading operation, an image reading sensitivity set for almost the 90th to 95th rows is determined as an optimal value.

A case wherein the finger touches the fingerprint reading surface with an offset in any direction in this image reading sensitivity setting method will be described.

Figure 12A:
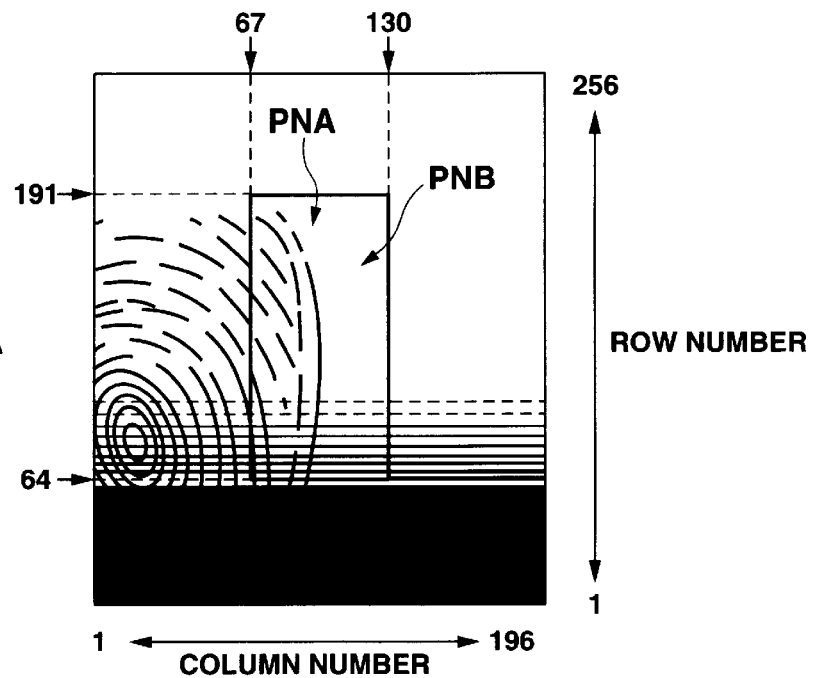
FIGS. 12A and 12B are views each showing a sensitivity determination region for the image data of FIG. 4.
Figure 12B:
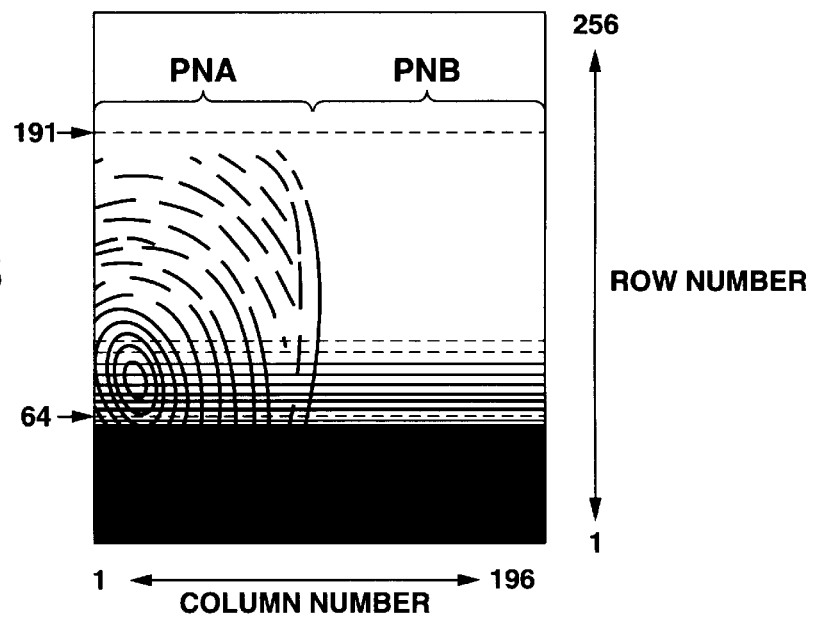

FIGS. 12A and 12B are views showing applications of the same sensitivity determination regions as in FIGS. 9A and 9B to the image data of FIG. 4 when a finger as a subject touches the fingerprint reading surface with an offset to the left in FIGS. 12A and 12B, and the read image becomes the same as in FIG. 4.

As shown in FIGS. 12A and 12B, image data acquired by pre-reading operation at predetermined sensitivity changes while the finger touches the fingerprint reading surface with an offset to the left contains the background pattern PNB in addition to the ridge/valley pattern of the original fingerprint image PNA subjected to sensitivity setting. Even if the sensitivity determination range is limited to a predetermined range (e.g., a row/column range of 64th to 191st rows and 67th to 130th columns in FIG. 12A or a row range of 64th to 191st rows in FIG. 12B), image data within the sensitivity determination range contains the background pattern PNB in addition to the ridge/valley pattern of the fingerprint image PNA.

A problem of this image reading sensitivity setting method when the finger touches the fingerprint reading surface with an offset will be explained.

Figure 13:
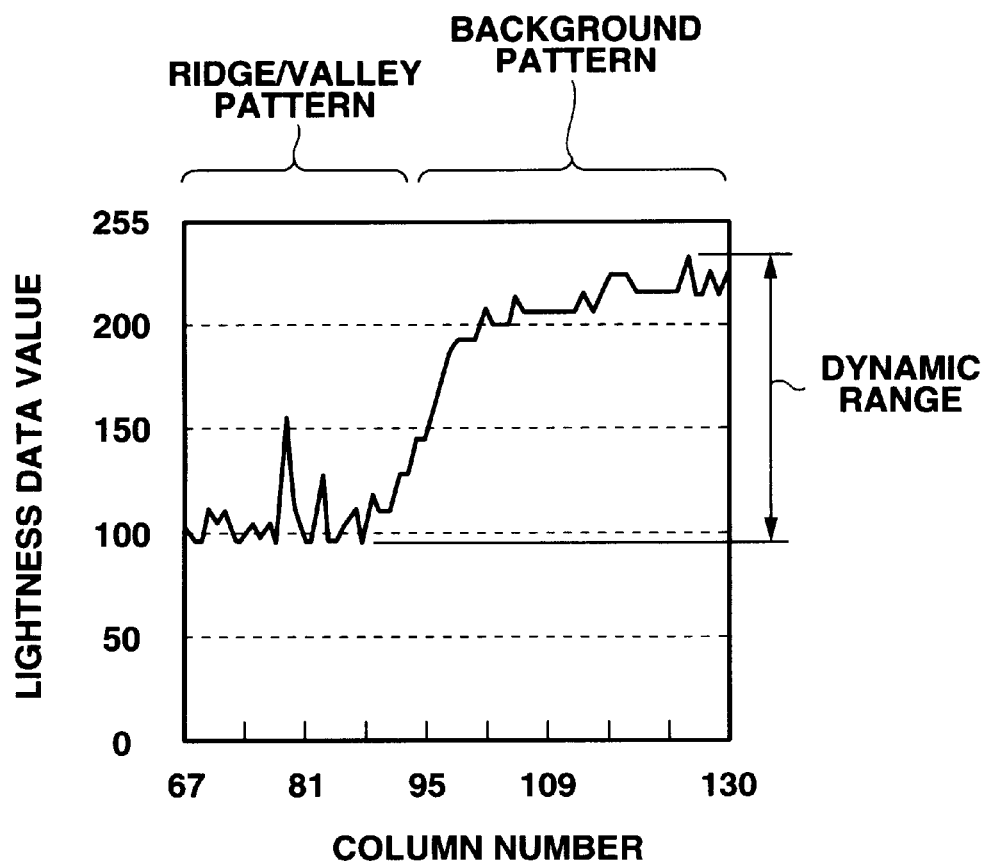
FIG. 13 is a graph showing changes in lightness data of a specific row of the image data of FIG. 4 within the sensitivity determination range shown in FIG. 12A.
Figure 14:
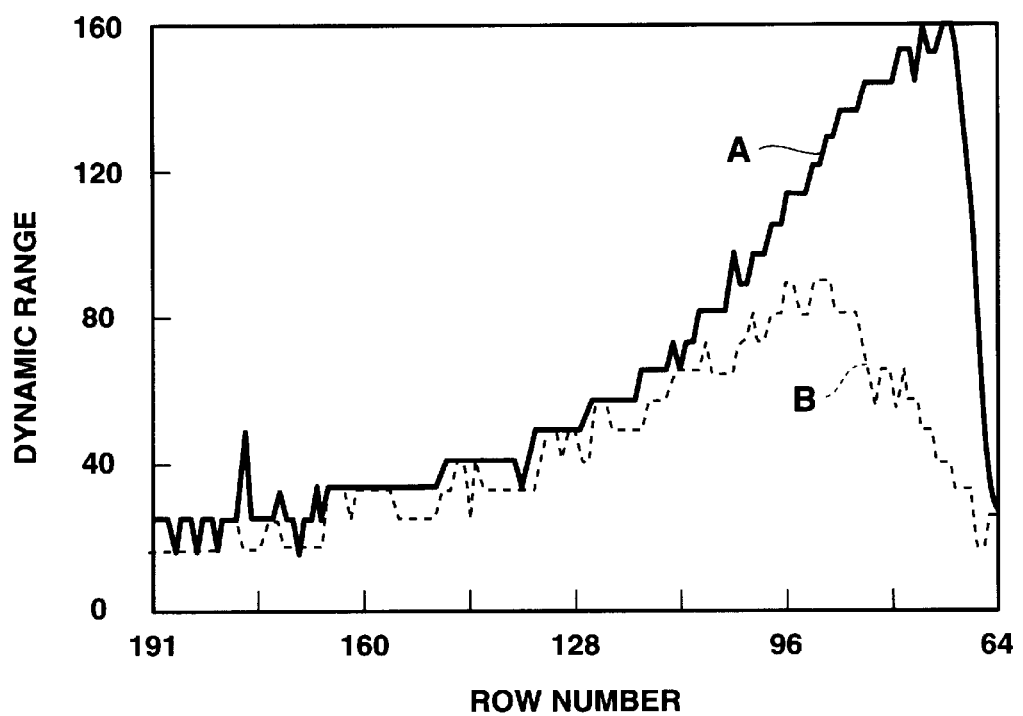
FIG. 14 is a graph showing changes in the dynamic ranges of lightness data of respective rows of the image data of FIG. 4 within the sensitivity determination range shown in FIG. 12A, and changes in the representative difference values of lightness data of respective rows.

FIG. 13 is a graph showing changes in lightness data of a specific row within the sensitivity determination range shown in FIG. 12A. FIG. 14 is a graph showing the dynamic range distribution of lightness data of respective rows within the similarly specified sensitivity determination range.

As shown in FIG. 13, in a range of almost the 67th to 95th columns where the ridge/valley pattern of the fingerprint is relatively clearly read, the lightness data on the 79th row exhibits an almost intermediate value (about 100) in almost all the columns, and the lightness data between pixels (i.e., columns) relatively greatly changes. To the contrary, in a range of almost 96th to 130th columns where no finger is placed and the background is read, the lightness data exhibits an excessively high value (about 210 to 220) in almost all the columns, and the lightness data between pixels (columns) hardly changes.

Maximum and minimum values are extracted from this lightness data distribution, and a dynamic range corresponding to the difference is calculated. At this time, the minimum value is extracted from the ridge/valley pattern of the fingerprint, but the maximum value is extracted from the background pattern irrelevant to the fingerprint image. As described above, the lightness data value on the background pattern is often much larger than the lightness data value on the ridge/valley pattern of the fingerprint image. For this reason, the dynamic range of lightness data is calculated as a large value regardless of the fingerprint image. The dynamic range of lightness data is plotted to attain, e.g., results represented by a solid line A in FIG. 14. A broken line B in FIG. 14 represents the dynamic range distribution of lightness data shown in FIG. 11 when the finger normally touches almost the center of the fingerprint reading surface. A row in which the broken line B maximizes corresponds to a row having an optimal image reading sensitivity.

To the contrary, the maximum value of the dynamic range of lightness data when the finger touches the fingerprint reading surface with an offset to the left is determined in accordance with the background pattern regardless of the fingerprint image. Thus, a row having the maximum dynamic range is different from a row having the maximum dynamic range of lightness data represented by B (broken line) obtained when the finger normally touches almost the center of the fingerprint reading surface. Even if a row having the maximum dynamic range is extracted based on data of the dynamic range of lightness data when the finger touches the fingerprint reading surface with an offset to the left, the extracted row may not correspond to an optimal image reading sensitivity.

More specifically, if the sensitivity determination range is set narrow, as shown in FIG. 9A or 12A, in order to perform sensitivity setting processing using the ridge/valley pattern of a clearly read fingerprint, proper sensitivity setting processing may fail when the position of the finger touching the fingerprint reading surface offsets, or the width of the finger changes. Moreover, the finger may not touch the sensitivity determination range. This degrades the effectiveness of sensitivity setting processing.

Even if the sensitivity determination range is limited to only a row range, and the column range is set wide, as shown in FIG. 9B or 12B, the dynamic range distribution of respective rows is influenced by the background pattern other than the fingerprint image, as described above, and is greatly different in change trend from a normal dynamic range distribution obtained by only the ridge/valley pattern of the fingerprint. Even in setting of this sensitivity determination range, an optimal image reading sensitivity may not be determined from a row having a maximum dynamic range.

To the contrary, the sensitivity setting method of the photosensor system according to the present invention can accurately extract a row having an optimal sensitivity even when the position of the finger offsets from a normal position or image data is read without limiting the sensitivity determination range, because the distribution of respective rows for the representative difference value serving as the maximum absolute difference value among the absolute difference values of lightness data between adjacent pixels of each row exhibits a change trend very close to the dynamic range distribution of lightness data of respective rows obtained when the finger is normally placed. Accordingly, an optimal light accumulating period can be determined.

According to the sensitivity adjustment apparatus and method of this embodiment, a subject image is pre-read while the image reading sensitivity is changed stepwise for respective rows. A row in an optimal image reading state is easily and properly determined based on the distribution trend of the representative difference values of lightness data of respective rows. An image reading sensitivity set for this row can be set as an optimal sensitivity. Sensitivity adjustment processing can, therefore, be uniquely set by a simple method regardless of the position of a finger on the fingerprint reading surface or the sensitivity determination range.

Sensitivity adjustment processing can be executed using an actual subject prior to normal image reading operation. Even when the brightness of a subject changes depending on changes in ambient light, an optimal image reading sensitivity can be set in accordance with changes in ambient light, and no dedicated circuit for detecting ambient light need be installed.

Even if the characteristics of the photosensor change, processing of obtaining an optimal sensitivity from image data attained by the photosensor can be performed to greatly suppress the influence of characteristic changes. This can greatly suppress the influence of characteristic variations. In addition, since an optimal sensitivity can be set using an actual subject, sensitivity adjustment processing can be easily executed without preparing any standard sample in sensitivity adjustment processing.

In this embodiment, the row/column range of lightness data is limited to 64th to 191st rows and 67th to 130th columns. However, the present invention is not limited to this, and can be applied without limiting the sensitivity determination range, as described above.

When calculation processing of the absolute difference value of lightness data is performed for only specific rows within a row/column range set in the sensitivity determination range in advance, the number of data to be processed can be decreased to simplify processing and shorten the time required for sensitivity adjustment processing, and the operation can quickly shift to normal reading operation of a subject image.

An image reading sensitivity (charge accumulating period) setting method applicable to pre-reading operation in the above-described embodiment will be described with reference to the several views of the accompanying drawing. This method will be explained by properly referring to the arrangement of the photosensor system shown in FIGS. 1, 2, and 18A.

FIGS. 15A to 15J are timing charts showing the first embodiment of the image reading sensitivity (charge accumulating period) setting method. According to the image reading sensitivity setting method of this embodiment, as shown in FIGS. 15A to 15D, reset pulses $\phi T1$, $\phi T2$, ..., $Tn-1$, $\phi Tn$ are simultaneously applied to respective top gate lines 101 connected to the top gate terminals TG of double-gate photosensors 10 in the row direction, thereby simultaneously starting a reset period $T_{reset}$, and initializing the double-gate photosensors 10 of respective rows.

The reset pulses $\phi T1$, $\phi T2$, ..., $Tn-1$, $\phi Tn$ simultaneously fall to end the reset period $T_{reset}$. Then, charge accumulating periods $T_1$, $T_2$, ..., $T_{n-1}$, $T_n$ of the double-gate photosensors 10 in all the rows simultaneously start, and charges (positive holes) are generated and accumulated in the channel regions in accordance with light quantities entering the double-gate photosensors 10 of respective rows from their top gate electrode side.

As shown in FIGS. 15E to 15I, a pre-charge pulse $\phi pg$ and readout pulses $\phi B1$, $\phi B2$, ..., $\phi Bn$ are applied to change stepwise the charge accumulating periods $T_1$, $T_2$, ..., $T_{n-1}$, $T_n$ set for respective rows by a predetermined delay time $T_{delay}$ for respective rows. In this case, the delay time $T_{delay}$ is equal to or longer than the total time of the reset period $T_{reset}$, pre-charge time $T_{prch}$, and readout time $T_{read}$.

Hence, image data read at reading sensitivities different for respective rows constituting a subject image can be attained by one reading operation of the subject image in pre-reading operation performed prior to sensitivity setting processing as described in the above embodiment.

FIGS. 16A to 16J are timing charts showing the second embodiment of the image reading sensitivity (charge accumulating period) setting method.

According to the image reading sensitivity setting method of this embodiment, as shown in FIGS. 16A to 16D, the reset pulses φT1, φT2, . . . , φTn−1, φTn are sequentially applied to the respective top gate lines 101 connected to the top gate terminals TG of the double-gate photosensors 10 in the row direction at a time interval of a predetermined delay time $T_{delay}$, thereby starting the reset period $T_{reset}$, and initializing the double-gate photosensors 10 of respective rows.

The reset pulses φT1, φT2, . . . , φTn−1, φTn fall to end the reset period $T_{reset}$. Then, charge accumulating periods $TA_1$, $TA_2$, . . . , $TA_{n-1}$, $TA_n$ sequentially start, and charges (positive holes) are generated and accumulated in the channel regions in accordance with light quantities entering the double-gate photosensors 10 of respective rows from their top gate terminal side.

As shown in FIGS. 16E to 16I, the pre-charge pulse φpg and readout pulses φBn, φBn−1, . . . , φB2, φB1 are applied to change stepwise the charge accumulating periods $TA_1$, $TA_2$, . . . , $TA_{n-1}$, $TA_n$ set for respective rows by the predetermined delay time $T_{delay}$ for respective rows after the final reset pulse φTn falls. In this case, the delay time $T_{delay}$ is equal to or longer than the total time of the reset period $T_{reset}$, pre-charge time $T_{prch}$, and readout time $T_{read}$.

By this pre-reading operation, the charge accumulating periods $TA_1$, $TA_2$, . . . , $TA_{n-1}$, $TA_n$ set for respective rows increase at a time interval twice the predetermined delay time $T_{delay}$, and thus image data read at reading sensitivities set at a sensitivity adjustment width of several rows or more can be obtained by reading operation of one frame.

The image reading sensitivity (charge accumulating period) setting method applied to sensitivity setting processing according to the present invention is not limited to the above embodiments. As far as image data of a subject image can be obtained at different reading sensitivities, e.g., a series of processes described in the prior art: reset operation→charge accumulating operation→pre-charge operation→readout operation can be repeated a plurality of number of times at different reading sensitivities, thereby obtaining image data at different reading sensitivities. Alternatively, any other methods may also be employed.

The effective voltages of signals applied to the top and bottom gates TG and BG of the double-gate photosensor 10 will be described.

As is apparent from FIGS. 15A to 15H, 16A to 16H, and 20A to 20C, the top gate TG receives a high-level signal voltage Vtgh as a reset pulse only for a very short time ($T_{reset}$), and a low-level signal voltage Vtgl for the remaining relatively long period in pre-reading operation and image reading operation. In the pre-reading operation and image reading periods, the effective voltage applied to the top gate TG greatly shifts to the low-level side. Since an optimal charge accumulating period set for image reading operation is changed and set in accordance with the ambient illuminance or the like if necessary, the effective voltage applied to the top gate TG inevitably varies.

In pre-reading operation and image reading operation, the bottom gate BG receives a high-level signal voltage Vbgh only for a very short time ($T_{read}$), and a low-level signal voltage Vbgl for the remaining relatively long period. In the pre-reading and image reading periods, the effective voltage applied to the bottom gate BG also greatly shifts to the low-level side. Since an optimal charge accumulating period set for image reading operation is changed and set in accordance with the ambient illuminance or the like if necessary, the effective voltage applied to the bottom gate BG inevitably varies.

If such a voltage shifted to a voltage of a specific polarity is kept applied to the gate electrode, the gate electrode traps positive holes to degrade the element characteristics of the double-gate photosensor and change the sensitivity characteristics.

To prevent this, an effective voltage adjusting period for correcting effective voltages applied to the top and bottom gates TG and BG is set after the pre-reading and image reading periods. During the effective voltage adjusting period, e.g., predetermined correction signals for setting an effective voltage applied to the top gate TG to an optimal value Vte of the effective voltage on the top gate side set in accordance with the sensitivity characteristics of the double-gate photosensor, and an effective voltage applied to the bottom gate BG to an optimal value Vbe of the effective voltage on the bottom gate side are applied. This can suppress changes in sensitivity characteristics caused by degradation in the element characteristics of the photosensor, and can improve the reliability of the photosensor system.

A photosensor system drive control method according to the present invention when the effective voltage adjusting period is set after the pre-reading and image reading periods, as described above, will be described with reference to FIGS. 17A to 17H.

FIGS. 17A to 17H are timing charts showing an embodiment when the effective voltage adjusting period is set after the pre-reading and image reading periods.

As the drive control method during the pre-reading period, the drive control method in FIGS. 16A to 16H described above is applied. The same reference numerals denote the same parts, and a description thereof will be omitted. The reset pulses φT1, φT2, . . . , φTn, are pulse signals whose high and low levels are signal voltages Vtgh and Vtgl, respectively. The readout pulses φB1, φB2, . . . , φBn are pulse signals whose high and low levels are signal voltages Vbgh and Vbgl, respectively. As the drive control method during the pre-reading period, the operation shown in FIGS. 15A to 15H may be applied. The present invention is not limited to these methods.

The drive control method during the image reading period is based on the conventional photosensor system drive control method shown in FIGS. 20A to 20D. To shorten the operation time, photosensors are driven by overlapping the charge accumulating periods of respective rows at timings so as not to overlap reset, pre-charge, and readout pulses. That is, as shown in FIGS. 17A to 17C, the reset pulses φT1, φT2, . . . , φTn are sequentially applied to the respective top gate lines 101 connected to the top gate terminals TG of the double-gate photosensors 10 in the row direction, thereby starting the reset period $T_{reset}$, and initializing the double-gate photosensors 10 of respective rows. Similar to the above-described pre-reading operation, the reset pulses φT1, φT2, . . . , φTn are pulse signals whose high and low levels are the signal voltages Vtgh and Vtgl, respectively. Except for timings at which the reset pulses φT1, φT2, ..., φTn of high-level Vtgh are applied, the low-level signal voltage Vtgl is applied.

The reset pulses φT1, φT2, ..., φTn fall to end the reset period $T_{reset}$. Then, optimal light accumulating periods Ta obtained by the above embodiment for respective rows based on pre-reading operation sequentially start, and charges (positive holes) are generated and accumulated in the channel regions in accordance with light quantities entering the double-gate photosensors 10 from their top gate electrode side. As shown in FIG. 17G, pre-charge operation of applying the pre-charge signal φpg to start the pre-charge period $T_{prch}$, and applying the pre-charge voltage $V_{prch}$ to the data line 103 to cause the drain electrode of the double-gate photosensor 10 to hold a predetermined voltage is performed during the light accumulating period Ta. As shown in FIGS. 17D to 17F, the readout pulses φB1, φB2, ..., φBn are sequentially applied in units of rows to the bottom gate lines 102 of double-gate photosensors 10 in which the optimal light accumulating period Ta and pre-charge period $T_{prch}$ end. Then, the readout period $T_{read}$ starts, and voltage changes VD corresponding to charges accumulated in the double-gate photosensors 10 are read out from the output circuit section 113 via the data lines 103, as shown in FIG. 17H. Similar to pre-reading operation described above, the readout pulses φB1, φB2, ..., φBn are pulse signals whose high and low levels are at the signal voltages Vbgh and Vbgl, respectively. Till timings at which the readout pulses φB1, φB2, ..., φBn of high-level Vbgh are applied, the low-level signal voltage Vbgl has been applied.

After image reading operation is completed for all the rows, effective voltage adjustment operation of adjusting the shifts of the effective voltages of signals applied to each gate electrode in the pre-reading and image reading periods and optimizing the effective voltages is executed in the effective voltage adjusting period. More specifically, as shown in FIGS. 17A to 17C, the top gate line 101 of each row receives a correction signal having a high-level period (Ttph) and low-level period (Ttpl) so as to attain a predetermined effective voltage capable of adjusting the effective voltage of a signal voltage applied to the top gate line 101, i.e., top gate terminal TG of the double-gate. photosensor 10 in response to a reset pulse in the pre-reading and image reading periods to an optimal value Vte set in advance in accordance with the sensitivity characteristics of the double-gate photosensor 10.

Similarly, the bottom gate line 102 of each row receives a correction signal having a high-level period (Tbph) and low-level periods (Tbpla and Tbplb) so as to attain a predetermined effective voltage capable of adjusting the effective voltage of a signal voltage applied to the bottom gate line 102, i.e., bottom gate terminal BG of the double-gate photosensor 10 in response to a readout pulse to an optimal value Vbe set in advance in accordance with the sensitivity characteristics of the double-gate photosensor 10.

As a result, the effective values of voltages applied to the top and bottom gates TG and BG of the photosensor element can be set to optimal values to suppress changes in sensitivity characteristics caused by degradation in the element characteristics of the photosensor, and to improve the reliability of the photosensor system.

What is claimed is:

1. A photosensor system comprising:
   a photosensor array constituted by two-dimensionally arraying a plurality of photosensors;
   image reading means for reading a subject image made up of pixels corresponding to the plurality of photosensors at a predetermined image reading sensitivity by said photosensor array;
   pre-reading means for reading the subject image prior to image reading operation while changing an image reading sensitivity of said photosensor array at a plurality of stages;
   reading sensitivity extraction means for extracting an image reading sensitivity having a maximum absolute difference value among absolute difference values between adjacent pixels in a predetermined measurement amount relating to an image pattern of the subject image read by said pre-reading means; and
   reading sensitivity setting means for setting the image reading sensitivity extracted by said reading sensitivity extraction means to a reading sensitivity of said image reading means.

2. A system according to claim 1, wherein pre-reading operation by said pre-reading means is executed by setting different image reading sensitivities stepwise for respective rows of said photosensor array and reading the subject image.

3. A system according to claim 1, wherein the predetermined measurement amount in said reading sensitivity extraction means is lightness data corresponding to the image pattern of the subject image read by pre-reading operation.

4. A system according to claim 1, wherein the image reading sensitivity of said photosensor array is set by adjusting a charge accumulating period of the photosensor.

5. A system according to claim 1, wherein said reading sensitivity extraction means comprises:
   absolute difference value calculation means for calculating an absolute difference value between adjacent pixels for each image reading sensitivity in the predetermined measurement amount relating to the image pattern of the subject image read by said pre-reading means;
   representative difference value extraction means for extracting a maximum absolute difference value as a representative difference value for each image reading sensitivity from the absolute difference values calculated by said absolute difference value calculation means; and
   optimal reading sensitivity extraction means for extracting an image reading sensitivity corresponding to the maximum representative difference value from the representative difference values for respective image reading sensitivities extracted by said representative difference value extraction means.

6. A system according to claim 5, wherein said absolute difference value calculation means calculates the absolute difference value of the predetermined measurement amount in predetermined row and column ranges of the subject image by said pre-reading means.

7. A system according to claim 1, which further comprises, in said image reading means and said pre-reading means of said photosensor array, effective voltage adjusting means for applying to each photosensor a correction signal for setting an effective voltage of a signal voltage from said photosensor to an optimal value which minimizes a change in a threshold voltage of said photosensor.

8. A system according to claim 1, wherein
   each photosensor has a semiconductor layer having a channel region, a source electrode and drain electrode formed on the semiconductor layer via the channel region, a top gate electrode and bottom gate electrode formed at least on and below the channel region, and insulating films respectively formed between the channel region and the top gate electrode and bottom gate electrode, either of the top gate electrode and bottom gate electrode is used as a light irradiation side, and charges corresponding to a light quantity irradiated from the light irradiation side are generated and accumulated in the channel region.

9. A drive control method for a photosensor system having a photosensor array constituted by two-dimensionally arraying a plurality of photosensors comprising the steps of:

executing pre-reading operation of reading a subject image made up of pixels corresponding to the plurality of photosensors while changing an image reading sensitivity of the photosensor array at a plurality of stages;

extracting an image reading sensitivity having a maximum absolute difference value among absolute difference values between adjacent pixels for each image reading sensitivity in a predetermined measurement amount relating to an image pattern of the subject image read in the pre-reading operation;

setting the extracted image reading sensitivity as a reading sensitivity in the reading operation of the subject image; and executing image reading operation of reading the subject image at the set reading sensitivity.

10. A method according to claim 9, wherein the step of executing the pre-reading operation comprises executing the pre-reading operation by setting different image reading sensitivities stepwise for respective rows of the photosensor array and reading the subject image.

11. A method according to claim 9, wherein the predetermined measurement amount is lightness data corresponding to the image pattern of the subject image read by the pre-reading operation.

12. A method according to claim 9, wherein the image reading sensitivity of the photosensor array is set by adjusting a charge accumulating period of the photosensor.

13. A method according to claim 9, wherein the step of extracting the image reading sensitivity comprises the sub-steps of:

calculating an absolute difference value between adjacent pixels for each image reading sensitivity in the predetermined measurement amount relating to the image pattern of the subject image read by the pre-reading operation;

extracting a maximum absolute difference value as a representative difference value for each image reading sensitivity from calculated absolute difference values; and extracting an image reading sensitivity corresponding to the maximum representative difference value from the extracted representative difference values for respective image reading sensitivities.

14. A method according to claim 13, wherein the sub-step of calculating the absolute difference value comprises calculating the absolute difference value of the predetermined measurement amount in predetermined row and column ranges of the subject image read by the pre-reading operation.

15. A method according to claim 9, which further comprises a step of, in the image reading operation and the pre-reading operation of the photosensor array, applying to each photosensor a correction signal for setting an effective voltage of a signal voltage from the photosensor to an optimal value which minimizes a change in a threshold voltage of the photosensor.

16. A method according to claim 15, wherein each photosensor has a semiconductor layer having a channel region, a source electrode and drain electrode formed on the semiconductor layer via the channel region, a top gate electrode and bottom gate electrode formed at least on and below the channel region, and insulating films respectively formed between the channel region and the top gate electrode and bottom gate electrode, either of the top gate electrode and bottom gate electrode is used as a light irradiation side, and charges corresponding to a light quantity irradiated from the light irradiation side are generated and accumulated in the channel region.

\* \* \* \* \*